United States Patent
Stinson, III

(10) Patent No.: US 8,593,402 B2
(45) Date of Patent: Nov. 26, 2013

(54) SPATIAL-INPUT-BASED CURSOR PROJECTION SYSTEMS AND METHODS

(75) Inventor: Willis D. Stinson, III, Sherborn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 860 days.

(21) Appl. No.: 12/771,446

(22) Filed: Apr. 30, 2010

(65) Prior Publication Data

US 2011/0267265 A1    Nov. 3, 2011

(51) Int. Cl.
*G06F 3/033*    (2013.01)

(52) U.S. Cl.
USPC .......................................... 345/157; 345/158

(58) Field of Classification Search
USPC ................... 345/156–168, 204–215
See application file for complete search history.

(56) References Cited

U.S. PATENT DOCUMENTS

| | | | |
|---|---|---|---|
| 5,107,443 A | 4/1992 | Smith et al. |
| 5,239,373 A | 8/1993 | Tang et al. |
| 5,381,158 A | 1/1995 | Takahara et al. |
| 5,442,788 A | 8/1995 | Bier |
| 5,534,917 A | 7/1996 | MacDougall |
| 5,561,811 A | 10/1996 | Bier |
| 5,594,469 A | 1/1997 | Freeman et al. |
| 5,677,700 A | 10/1997 | Schwalba et al. |
| 5,732,227 A | 3/1998 | Kuzunuki et al. |
| 5,767,842 A | 6/1998 | Korth |
| 5,917,490 A | 6/1999 | Kuzunuki et al. |
| 6,008,800 A | 12/1999 | Pryor |
| 6,100,538 A * | 8/2000 | Ogawa ............... 250/559.29 |
| 6,128,003 A | 10/2000 | Smith et al. |
| 6,191,773 B1 | 2/2001 | Maruno et al. |
| 6,222,465 B1 * | 4/2001 | Kumar et al. ............. 341/20 |
| 6,266,057 B1 | 7/2001 | Kuzunuki et al. |
| 6,417,841 B1 | 7/2002 | Doi et al. |
| 6,498,628 B2 | 12/2002 | Iwamura |
| 6,498,970 B2 | 12/2002 | Colmenarez et al. |
| 6,501,515 B1 | 12/2002 | Iwamura |
| 6,594,616 B2 | 7/2003 | Zhang et al. |
| 6,624,833 B1 | 9/2003 | Kumar et al. |
| 6,720,949 B1 | 4/2004 | Pryor et al. |
| 6,788,809 B1 | 9/2004 | Grzeszczuk et al. |
| 6,952,199 B2 | 10/2005 | Doi et al. |
| 6,996,460 B1 | 2/2006 | Krahnstoever et al. |
| 7,007,236 B2 | 2/2006 | Dempski et al. |
| 7,058,204 B2 | 6/2006 | Hildreth et al. |
| 7,134,080 B2 | 11/2006 | Kjeldsen et al. |
| 7,227,526 B2 | 6/2007 | Hildreth et al. |

(Continued)

OTHER PUBLICATIONS

Engadget, Headtracking, 1 page, http://www.engadget.com/2007/12/21/diy-head-tracker-takes-wiimote-hacking-to-dizzying-new-heights/, as accessed on Aug. 4, 2010.
Rationalcraft, Winscape, 3 pages, http://rationalcraft.com/Winscape.html, as accessed on Aug. 6, 2010.

(Continued)

*Primary Examiner* — Vijay Shankar

(57) ABSTRACT

Exemplary spatial-input-based cursor projection systems and methods are disclosed herein. An exemplary method includes a cursor projection system detecting spatial input provided by a user within a physical user space associated with a display screen, determining that the spatial input is associated with a request for cursor projection, and mapping the spatial input to at least one cursor position on the display screen based on at least one of a plane projection heuristic and a vector projection heuristic. Corresponding systems and methods are also disclosed.

24 Claims, 18 Drawing Sheets

(56) References Cited

U.S. PATENT DOCUMENTS

| | | |
|---|---|---|
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,430,312 B2 | 9/2008 | Gu |
| 2002/0036617 A1 | 3/2002 | Pryor |
| 2002/0186200 A1 | 12/2002 | Green |
| 2003/0032478 A1 | 2/2003 | Takahama et al. |
| 2004/0063480 A1 | 4/2004 | Wang |
| 2004/0063481 A1 | 4/2004 | Wang |
| 2004/0155902 A1 | 8/2004 | Dempski et al. |
| 2004/0190776 A1 | 9/2004 | Higaki et al. |
| 2004/0193413 A1 | 9/2004 | Wilson et al. |
| 2005/0104850 A1 | 5/2005 | Hu et al. |
| 2005/0259035 A1 | 11/2005 | Iwaki et al. |
| 2006/0010400 A1 | 1/2006 | Dehlin et al. |
| 2006/0033713 A1 | 2/2006 | Pryor |
| 2006/0044265 A1 | 3/2006 | Min |
| 2006/0125845 A1 | 6/2006 | Takeuchi et al. |
| 2008/0040692 A1 | 2/2008 | Sunday et al. |
| 2008/0052643 A1 | 2/2008 | Ike et al. |
| 2008/0120577 A1 | 5/2008 | Ma et al. |

OTHER PUBLICATIONS

Gettys, J. "SNAP Computing and the X Window System". *Proceedings of the Linux Symposium*, vol. 1. Jul. 20-23, 2005. Ottawa, Canada.

Gesturetek, GestPoint, 1 page, http://www.gesturetek.com/gestpoint/holopttrackingfrm.php, as accessed on Apr. 22, 2010.

Gesturetek, Gesturetek Tradeshow Demo, 1 page, http://www.youtube.com/watch?v=BrvtvfM-WCw, as accessed on Apr. 22, 2010.

EON, TouchLight, 1 page, http://www.youtube.com/watch?v=DTMLdjVoLQw, as accessed on Apr. 22, 2010.

Atlas Gloves, Atlas Gloves Demo, 1 page, http://atlasgloves.org/demo, as accessed on Apr. 22, 2010.

Oblong Industries, G-Speak, 1 page, http://www.youtube.com/watch?v=dyMVZqJk8s4, as accessed on Apr. 22, 2010.

Jeff Han, Multi-Touch Sensing, 1 page, http://www.youtube.com/watch?v=zwGAKUForhM, as accessed on Apr. 22, 2010.

Toshiba, Gesture Interface Demo, 1 page, http://www.youtube.com/watch?v=RL9MpXhWCrQ, as accessed on Apr. 22, 2010.

Engadget, Winscape Virtual Window, 1 page, http://www.engadget.com/2010/04/15/winscape-virtual-window-features-wiimote-headtracking-absolutel/, as accessed on Apr. 30, 2010.

\* cited by examiner

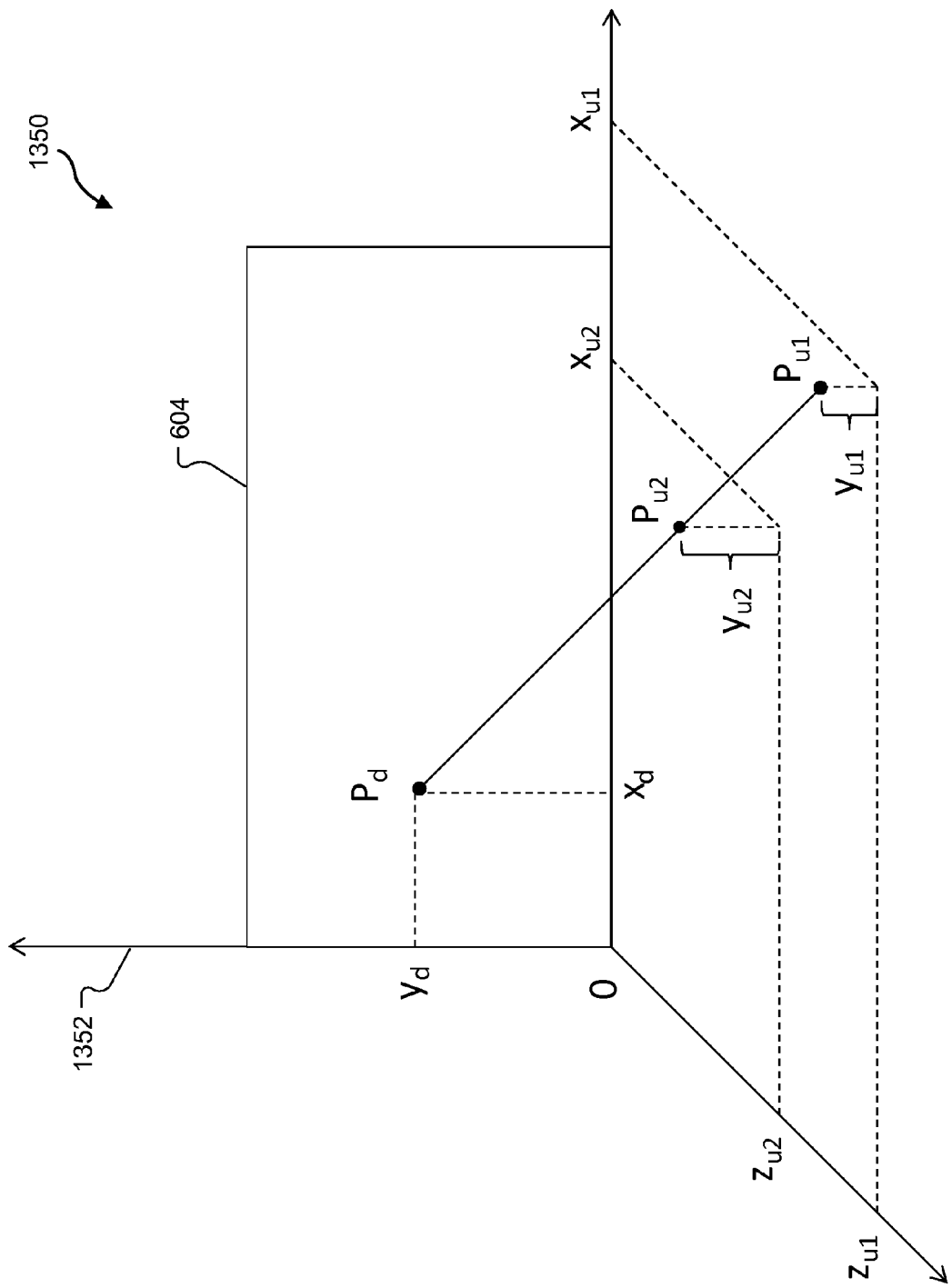

SPATIAL-INPUT-BASED CURSOR PROJECTION SYSTEMS AND METHODS

BACKGROUND INFORMATION

As computer system technologies have advanced, so too have user interface technologies that allow users to interact with computer systems. For example, increasingly large and complex display screens capable of displaying output (e.g., graphical user interfaces) provided by computer systems have become available to consumers. In addition, a large variety of technologies for receiving user input have been developed. For instance, a user of a computer system may utilize an input device such as a mouse, track pad, track ball, keyboard, pen, touch screen, or infrared remote control device to provide input to control a computer system implemented on a personal computer, mobile phone, set-top box, or other computing device. Other user input technologies have been developed that allow users to provide input in the form of voice commands or visually-detected hand gestures.

One commonly accepted user input technique is the use of an input device to control movement of a cursor displayed on a display screen. This technique allows a user to move a cursor over a screen object displayed on a display screen and to provide additional input to indicate a selection of the screen object. In this manner, a user may provide input to manipulate a cursor to control operation of a computer system.

However, there remains room for improvement of existing user input technologies and/or development of additional user input technologies. For example, traditional technologies for visually detecting user input such as hand gestures may not be practical for certain implementations of computer systems. For instance, such existing technologies may be too complex and/or resource intensive to be feasible for certain implementations of computer systems. In addition, such existing technologies lack functionality and/or features that may be desirable for certain implementations of computer systems.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 13B illustrates a graphical representation of a display screen and locations of vector-based projection reference points within a three-dimensional coordinate system.

DETAILED DESCRIPTION OF PREFERRED EMBODIMENTS

Exemplary spatial-input-based cursor projection systems and methods are disclosed herein. As described in more detail further below, one or more of the exemplary systems and methods disclosed herein may enable a user to provide spatial input (e.g., one or more hand gestures) to control one or more cursors (invisible or displayed) on a display screen. The spatial input may be detected and mapped to one or more positions on the display screen at which one or more cursors may be positioned. The cursor positions on the display screen may be determined using at least one of a plane projection heuristic and a vector projection heuristic. As described further below, these heuristics, used alone or in combination, may be used to determine one or more cursor positions based on spatial input in ways that provide for efficient mapping of spatial input to cursor positions, as well as for new or improved spatial-input-based functionalities and/or features.

In certain implementations, one or more users may control one or more cursor positions on a television, computer monitor, video game display device, wall-mounted display device, or other display device by providing spatial input that may be detected and used to determine the cursor positions on the television, computer monitor, or other display device. Accordingly, one or more operations of a computing system associated with the television, computer monitor, or other display device may be controlled by one or more users providing spatial input that is used to project one or more cursors onto a display.

As used herein, the term "spatial input" may refer to any user input that is provided by a user within a physical user space associated with a display screen (e.g., a user space located a certain distance away from and in front of the display device). In certain embodiments, spatial input may be provided by one or more users within the physical user space associated with the display screen without the users having to hold or otherwise utilize user input devices within the physical user space. For example, one or more users may perform gestures, such as hand gestures, within the physical user space. The term "cursor position" as used herein may refer to any position on a display screen that is mapped from spatial input and that may be used as input to and/or to control one or more operations of and/or applications running on a computing system associated with the display screen. The term "cursor" or "cursor object" as used herein may refer to any invisible or displayed object associated with a cursor position on a display screen. The term "cursor projection" may refer to any mapping of spatial input to one or more cursor positions of one or more cursors on a display screen. Exemplary spatial-input-based cursor projection systems and methods will now be described in reference to the drawings.

Figure 1:
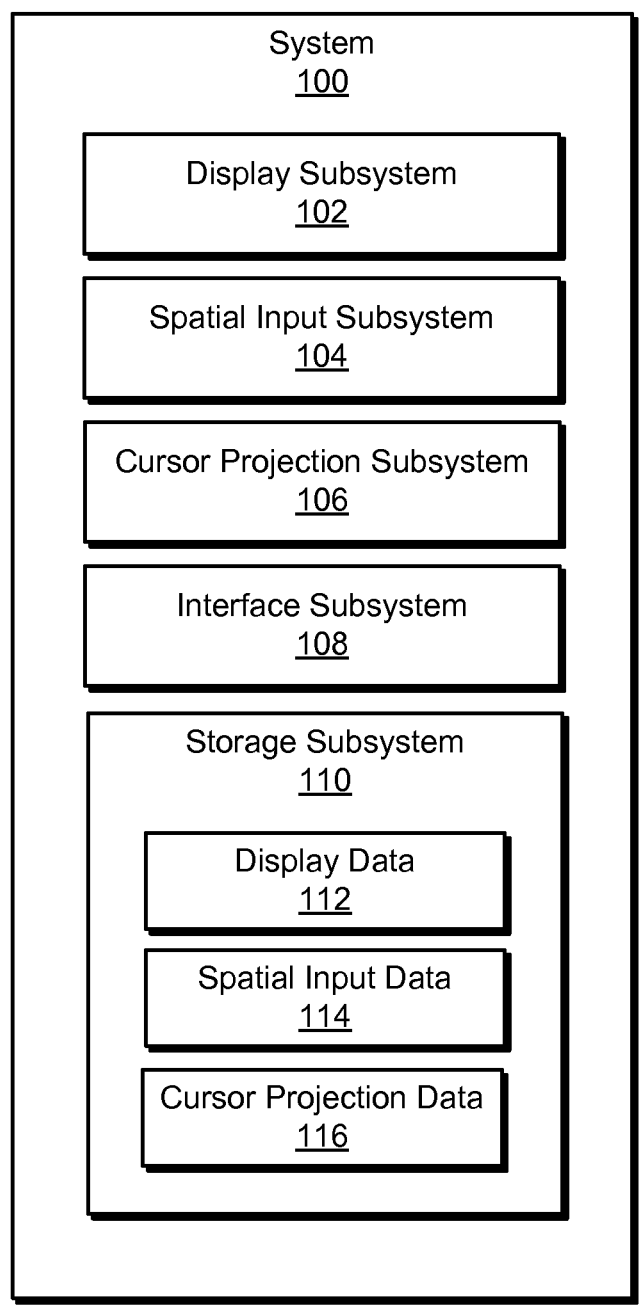
FIG. 1 illustrates an exemplary cursor projection system according to principles described herein.

FIG. 1 illustrates an exemplary cursor projection system 100 (e.g., or simply "system 100"). System 100 may include, but is not limited to, a display subsystem 102, a spatial input subsystem 104, a cursor projection subsystem 106, an interface subsystem 108, and a storage subsystem 110, which may be communicatively coupled to one another using any suitable technologies.

Display subsystem 102 may include a display device configured to provide a display on a display screen of the display device for viewing by a user. The display device may include, without limitation, a television, a computer monitor, video game display device, wall-mounted display device, or other display device having a display screen on which a display may be presented for viewing by one or more users. A display may include any combination and/or layout of display content, which may include one or more graphical assets (e.g., frames, windows, cursors, and other graphical objects) presented in the display, application content presented in the display, media content presented in the display, and/or any other content presented in the display. Media content may include, without limitation, any television program, on-demand media program, pay-per-view media program, broadcast media program (e.g., broadcast television program), IPTV media content, advertisement (e.g., commercial), video, movie, video game, image, photograph, or any segment, component, or combination of these or other forms of media content that may be displayed for viewing by a user. Application content may include any content associated with an application running on a computing device, such as server-based application content, content associated with applications that execute on a local processor, video game content, web-based content such as webpage content, and/or any combination or sub-combination thereof that may be displayed for viewing by one or more users.

Display subsystem 102 may include any hardware, firmware, and/or software configured to facilitate a display of content on a display screen for viewing by one or more users. For example, display subsystem 102 may include a display device, display screen, display driver(s), graphics engine, and/or other components configured to provide and/or control a display on a display screen. In certain embodiments, display subsystem 102 may include one or more components of a computing device such as a set-top box or a personal computer that are configured to generate and provide data representative of display content to a display device such as a television or a computer monitor for display on a display screen of the display device.

Spatial input subsystem 104 may be configured to perform any of the spatial input operations described herein, including detecting spatial input provided by one or more users in a physical user space associated with a display screen. Spatial input subsystem 104 may be able to detect spatial input in any suitable way, including, for example, by employing two-dimensional and/or three-dimensional spatial sensing technologies capable of detecting spatial input within the physical user space associated with the display screen. For instance, spatial input subsystem 104 may include a single video camera configured for two-dimensional sensing (e.g., a single Charge-Coupled Device ("CCD") or CMOS-sensor camera configured for two-dimensional sensing), a stereo vision video camera configured for three-dimensional sensing, an array of video cameras configured for high-fidelity three-dimensional sensing, one or more infrared cameras, one or more time-of-flight sensors, one or more motion detectors, any other spatial input sensing technologies, and any combination or sub-combination thereof positioned relative to a display screen so as to monitor the physical user space associated with the display screen. An exemplary physical user space associated with a display screen is described in more detail further below.

Certain examples presented herein are described in reference to spatial input subsystem 104 being configured to visually detect user input such as gestures performed by one or more users within a physical user space associated with a display screen. These examples are illustrative only. Other spatial input detection technologies, including any of those listed above, may be employed in addition or alternative to the visual input detection technologies described herein.

Spatial input subsystem 104 may be further configured to identify and apply predefined input commands associated with detected spatial input. For example, spatial input subsystem 104 may detect user input such as one or more gestures acted out in a physical user space, identify predefined input commands associated with the detected gestures, and initiate execution of one or more operations based on the predefined input commands. The gestures may be predefined and/or learned. Spatial input subsystem 104 may be configured to learn gestures in order to detect and accommodate differences in how users physically perform canonical, predefined gestures and/or to allow users to define custom gestures according to personal abilities and/or preferences. In some examples, the input commands may be configured to initiate operations that may control and/or may be executed by system 100 and/or another computer system.

To support spatial-input-based control of operations of system 100, spatial input such as one or more user gestures may be predefined and associated with particular input commands (e.g., display screen input commands). Data representative of the predefined gestures may be stored as spatial input data 114 in storage subsystem 110 such that a detected gesture may be compared to one or more of the predefined gestures represented by spatial input data 114. When a comparison is made and a match is found, one or more input commands associated with the matching predefined gesture may be applied by spatial input subsystem 104 such that system 100 may consider the input command(s) and/or perform one or more operations in response to the input command(s).

As an example, a particular hand gesture (e.g., a hand having an index finger pointing at a display screen) may be predefined and associated with a user input command, such as a user request to project a cursor on a display device. Data representative of the predefined hand gesture may be stored as spatial input data 114 in storage subsystem 110. Subsequently, spatial input subsystem 104 may detect a hand gesture made by a user within the monitored physical user space, compare the detected hand gesture to spatial input data 114 representative of predefined hand gestures, determine that the detected hand gesture matches the predefined hand gesture associated with a user request to project a cursor on a display device, determine that the predefined hand gesture is associated with a user request to project a cursor on a display device, and apply the user request such as by providing data associated with the detected spatial input to cursor projection subsystem 106 for use in projecting a cursor on the display device based on the spatial input.

In certain exemplary embodiments, spatial input subsystem 104 may be configured to detect spatial input without the user having to hold, be attached to, or otherwise utilize a user input device within the physical user space. For example, a user may be able to use only his or her body to act out gestures that may be visually detected by spatial input subsystem 104. In some examples, a user may use one or both of his or her hands to act out hand gestures that may be visually detected by spatial input subsystem 104, without the user having to hold a user input device such as a remote control device, a mouse, a marker, or other input device.

Cursor projection subsystem 106 may be configured to perform any of the cursor projection operations described herein, including receiving data representative of spatial input from spatial input subsystem 104 and mapping spatial input to one or more positions on a display screen based on at least one of a plane projection heuristic and a vector projection heuristic, which are described in detail further below. As mentioned, these projection heuristics, used alone or in combination, may determine cursor position on a display screen based on spatial input in ways that provide for efficient mapping of spatial input to cursor position, as well as for new or improved user input functionalities and/or features.

Cursor projection subsystem 106 may store, maintain, and/or utilize cursor projection data 116 in storage subsystem 110. Cursor projection data 116 may include any data that may be used for cursor projection operations and/or that may be generated by cursor projection operations. For example, cursor projection data 116 may include data representative of a plane projection heuristic and/or a vector projection heuristic, which may be used by cursor projection subsystem 106 to determine cursor position on a display screen based on spatial input. Cursor projection data 116 may also include data representative of one or more determined cursor positions on a display screen, which may be used by system 100 to execute one or more operations based on cursor position. For example, data representative of one or more cursor positions may be provided to display subsystem 102 for use in generating a display of one or more cursors on the display screen.

Interface subsystem 108 may be configured to provide one or more interfaces between display subsystem 102, spatial input subsystem 104, cursor projection subsystem 106, and any computing hardware, firmware, and/or software associated with system 100. For example, interface subsystem 108 may provide an interface by which display subsystem 102, spatial input subsystem 104, and/or cursor projection subsystem 106 may communicate with an operating system and/or display content managers (e.g., application and/or media content managers) of a computing device. Interface subsystem 108 may include and/or employ any suitable technologies to provide such interfaces.

Storage subsystem 110 may store electronic data maintained and/or accessible by display subsystem 102, spatial input subsystem 104, cursor projection subsystem 106, and/or interface subsystem 108. Storage subsystem 110 may include one or more data storage media, devices, or configurations and may employ any type, form, and combination of data storage media and/or devices. For example, storage subsystem 110 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage subsystem 110.

System 100, including subsystems 102-110, may include any computer hardware, computer-implemented instructions (e.g., firmware and/or software) embodied on a tangible computer-readable medium, or combinations of tangibly embodied computer-implemented instructions and hardware, configured to perform one or more of the processes described herein. In particular, system 100 may be implemented on one physical computing device or may be implemented on more than one physical computing device. Accordingly, system 100 may include or be implemented on any number of computing devices. Moreover, it will be recognized that although subsystems 102-110 are shown to be separate subsystems in FIG. 1, any of those subsystems may be combined into a single subsystem as may serve a particular application.

Accordingly, one or more of the processes described herein may be implemented at least in part as instructions executable by one or more appropriately configured computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 2:
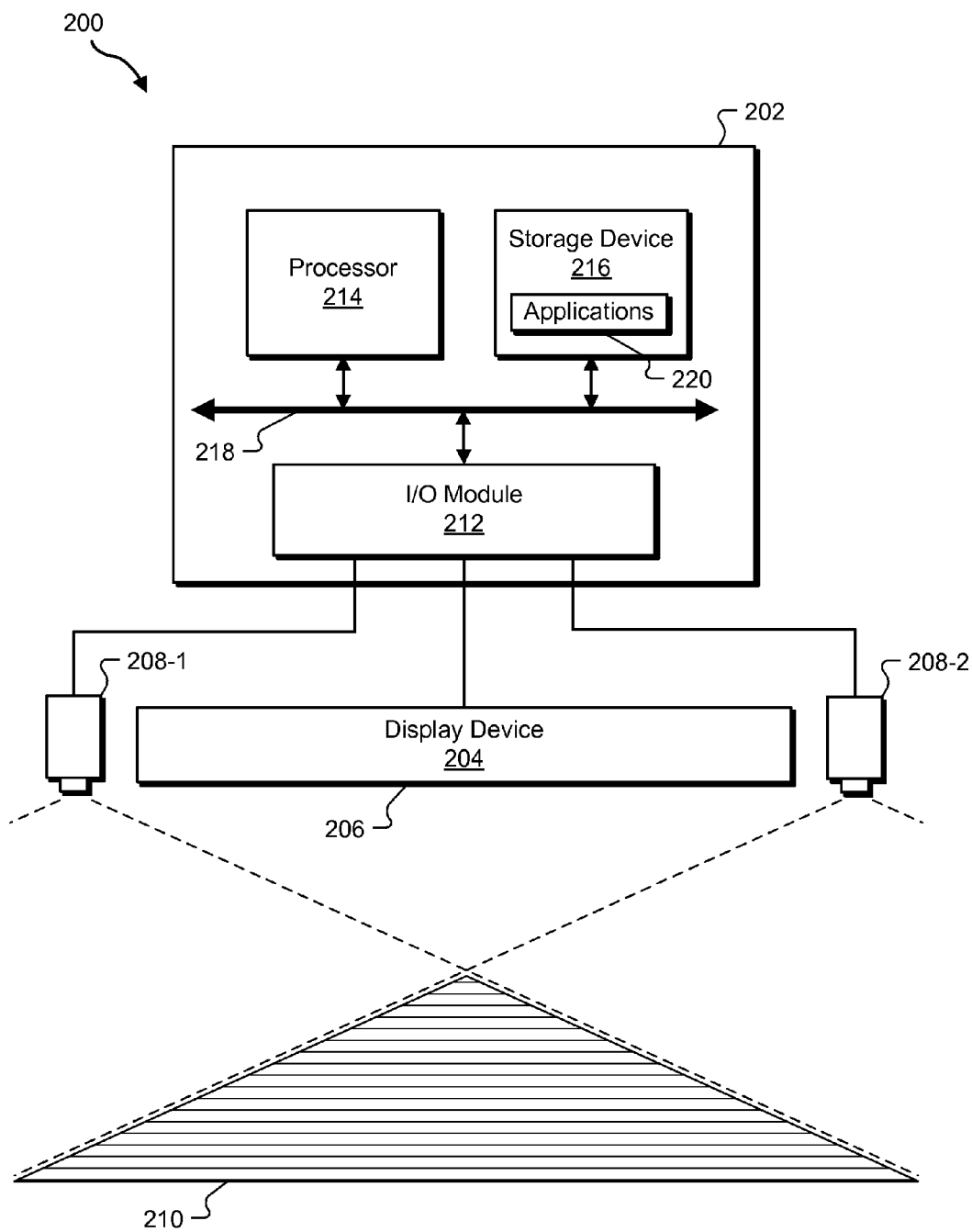
FIG. 2 illustrates a top view an exemplary implementation of the system of FIG. 1 according to principles described herein.

FIG. 2 illustrates a top view of an exemplary implementation 200 of system 100 in which a computing device 202 may be communicatively coupled to and configured to drive a display device 204 by providing one or more signals that may be utilized by display device 204 to generate and provide a display on a display screen 206 of display device 204. Computing device 202 may also be communicatively coupled to and configured to receive input signals from a set of sensing devices 208 (e.g., sensing devices 208-1 and 208-2) that are strategically positioned relative to display screen 206 (e.g., a certain distance from either side of display device 204). Each sensing device 208 may be configured to sense spatial input provided within a sensing space. A sensing space associated with each sensing device 208 is delineated by dashed lines extending away from each sensing device 208 in FIG. 2. An intersection of the sensing spaces associated with sensing devices 208 may form an overall sensing space 210 for the set of sensing devices 208. In FIG. 2, the overall sensing space 210 is depicted by a pattern of horizontal lines within an area of intersection of the sensing spaces of sensing devices 208-1 and 208-2. FIG. 2 shows a top view of the overall sensing space 210, which may be a three-dimensional space positioned in front of the display screen 206 of display device 204. Sensing devices 208 may be positioned such that the overall sensing space 210 includes and/or coincides with a physical user space typically occupied by one or more users when viewing the display screen 206 of display device 204. In certain embodiments, sensing devices 208 may be physically integrated within display device 204. In other embodiments, sensing devices 208 may be physically separate from display device 204.

In certain embodiments, sensing devices 208 may include a set of video cameras. Each camera in the set of cameras may be configured to capture video frame images within a field of view of the camera. In such embodiments, a field of view associated with each camera is delineated by dashed lines extending from each camera in FIG. 2. An intersection of the views associated with the cameras may form an overall field of view for the set of cameras. In FIG. 2, the overall field of view is equivalent to overall sensing space 210.

While FIG. 2 illustrates a two-sensor (e.g., a two-camera) sensing configuration that allows for three-dimensional sensing, this is illustrative only. Other configurations may be used in other embodiments. For example, a single-sensor (e.g., a single-camera) configuration may be employed and used for two-dimensional sensing.

Display device 204 may include any device configured to provide a display on display screen 206. Computing device 202 may include any device configured to drive display device 204 and update a display shown on display screen 206 of display device 204 based on spatial input. In certain embodiments, computing device 202 may include a set-top box and display device 204 may include a television connected to the set-top box. In other embodiments, computing device 202 may include a computer and display device 204 may include a monitor connected to the computer. In yet other embodiments, computing device 202 may include a gaming console and display device 204 may include a television or other display device connected to the gaming console. In yet other embodiments, computing device 202 may include a mobile computing device such as a mobile phone or mobile entertainment device.

Computing device 202 may include an input/output ("I/O") module 212, a processor 214, and a storage device 216 communicatively coupled one to another via a communication infrastructure 218. The components of computing device 202 may communicate with one another, including sending data to and receiving data from one another, using any suitable communication technologies. While exemplary components of computing device 202 are shown in FIG. 2, the components illustrated in FIG. 2 are not intended to be limiting. Additional or alternative components may be used in other embodiments. Components of the computing device 202 shown in FIG. 2 will now be described in additional detail.

I/O module 212 may be configured to transmit output signals and receive input signals to/from one or more other devices. For example, I/O module 212 may be configured to receive sensing data from sensing devices 208 (e.g., camera image data from cameras) and to output display signals to display device 204 for use by display device 204 to generate a display on display screen 206. I/O module 212 may include any suitable hardware, firmware, and/or software for transmitting output signals and receiving input signals to/from display device 204 and sensing devices 208. I/O module 212 may be connected to display device 204 and sensing devices 208 using any suitable technologies, such as IEEE 1394, DVI, HDMI, VGA, component video, Ethernet, USB, wireless, analog, digital, and/or other connections.

Processor 214 generally represents any type or form of processing unit capable of processing data or interpreting, executing, and/or directing execution of one or more of the instructions, processes, and/or operations described herein. Processor 214 may direct execution of operations in accordance with one or more applications 220 or other computer-executable instructions such as may be stored in storage device 216 or another computer-readable medium. As an example, processor 214 may be configured to process data, including processing sensing data received from sensing devices 208 (e.g., processing raw image data received from cameras).

Storage device 216 may include one or more data storage media, devices, or configurations and may employ any type, form, and combination of data storage media and/or device. For example, storage device 216 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 216. For example, data representative of one or more executable applications 220 configured to direct processor 214 to perform any of the operations described herein may be stored within storage device 216.

In some examples, display subsystem 102, spatial input subsystem 104, cursor projection subsystem 106, interface subsystem 108, and/or storage subsystem 110 may be partially or fully implemented by or within one or more components of computing device 202. For example, one or more applications 220 residing within storage device 216 may be configured to direct processor 214 to perform one or more processes or functions associated with display subsystem 102, spatial input subsystem 104, and/or cursor projection subsystem 106. Likewise, storage subsystem 110 may be implemented by or within storage device 216. For example, display data 112, spatial input data 114, and/or cursor projection data 116 may be stored within storage device 216.

Figure 3:
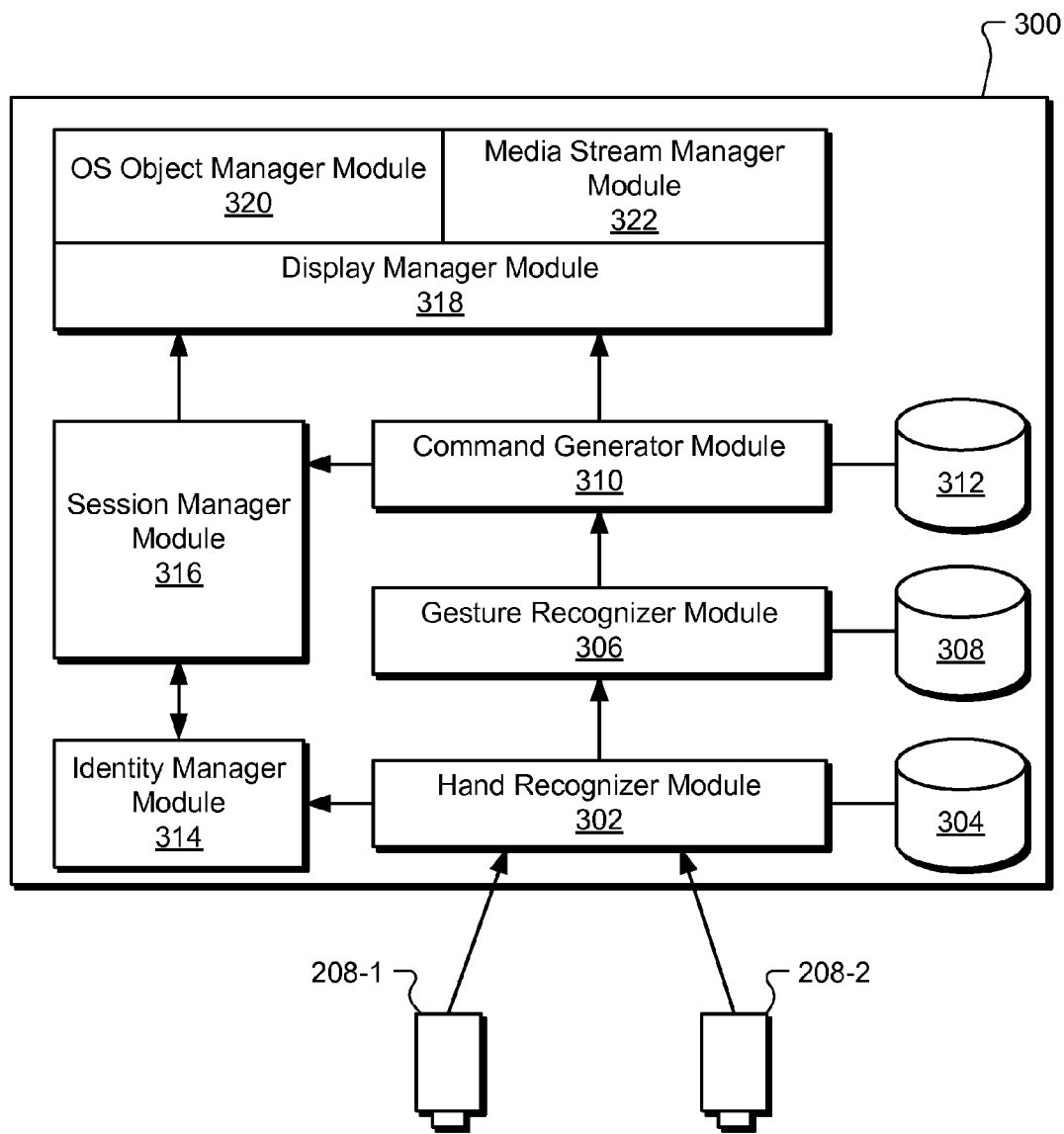
FIG. 3 illustrates an exemplary configuration of modules that may be included in the system of FIG. 1 and/or the implementation of FIG. 2 according to principles described herein.

FIG. 3 illustrates an exemplary configuration 300 of modules that may be included in or implemented by system 100 and/or computing device 202. In certain embodiments, for example, one or more modules within configuration 300 may be implemented as computer-readable instructions (e.g., as applications 220) that may be stored in storage device 216 and configured to direct processor 214 of computing device 202 to perform one or more of the operations described herein.

As shown in FIG. 3, configuration 300 may include a hand recognizer module 302 coupled to a hand reference data store 304, a gesture recognizer module 306 coupled to a gesture reference data store 308, a command generator module 310 coupled to a command reference data store 312, an identity manager module 314, a session manager module 316, a display manager module 318, an operating system ("OS") object manager module 320, and a media stream manager module 322.

Hand recognizer module 302 may be configured to receive and process sensing data provided by sensing devices 208, which, for illustrative purposes may include images captured by a set of one or more cameras. For example, raw image data captured by a set of one or more cameras may be received and stored in frame buffers. Hand recognizer module 302 may process the images in the frame buffers in real time, such as by performing an isochronous transformation function that converts raw camera data into recognizable hand objects. For example, starting with raw camera input data B at time t, $B_t=(b_{1t}, b_{2t})$, where $b_{1t}$ represents a frame buffer of a first camera at time t and $b_{2t}$ represents a frame buffer of a second camera at time t, a first transformation function h( ) may be performed by hand recognizer module 302 to convert the raw image data B into recognized hand objects. A given hand at time t may be described as $H_t=h(B_t, R_h)=(u,c)$, where u represents a user identifier, c represents a hand configuration vector, and $R_h$ represents hand reference models stored in hand reference data store 304.

The function h( ) may be computed in any way suitable for converting raw image data captured by a set of one or more cameras into data representative of recognized hand objects. In certain embodiments, for example, an execution of function h( ) may include using edge detection heuristics in combination with feature extraction heuristics (e.g., scaled Euclidean distance from a class mean, nearest neighbor search, and/or decision tree heuristics) to detect individual finger segments of a hand, a palm of a hand, a back of a hand, and/or other fixed shapes of a hand. The function h( ) may also be configured to consider basic affine transformations (e.g., scale, rotation, and translation) to account for movement and/or orientation of a hand relative to the set of one or more cameras. Detected parts of a hand may be compared with reference hand object models stored in hand reference data store 304 to identify matching hand parts, to connect hand parts together, to generate a vector of hand reference points H, and/or to identify a matching hand configuration.

Figure 4:
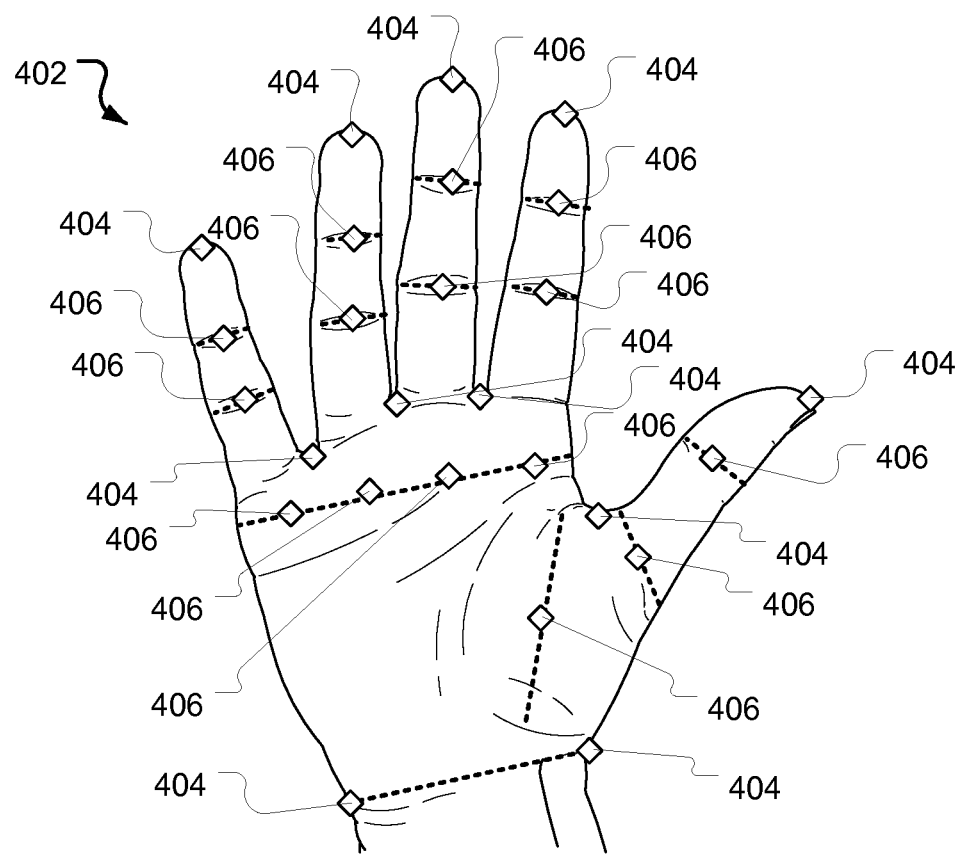
FIG. 4 illustrates an exemplary set of hand reference points in association with a hand according to principles described herein.

When a sufficient number of connected hand parts are detected, hand recognizer module 302 may generate a vector of hand reference points H, and compute a correspondence between reference points in the two frame buffers associated with the set of one or more cameras. Because the relative orientation of the set of one or more cameras is known, corresponding points may be computed by using the epipolar constraint. FIG. 4 illustrates an exemplary set of hand reference points in association with a hand 402. As shown, the set of hand reference points may include edge reference points 404 and pivot reference points 406. Edge reference points 404 may include points along an edge (e.g., a straight, curved, and/or corner edge) of a hand, and pivot reference points 406 may include points of articulation on joints of a hand. The vector of hand reference points H may be compared with reference hand configurations stored in hand reference data store 304 to identify a matching hand configuration.

Parts of a hand such as the hand 402 shown in FIG. 4 may be occluded from detection by cameras 208. Accordingly, a match of a detected hand (e.g., a vector of hand reference points H) with a reference hand model (i.e., a matching hand configuration) stored in hand reference data store 304 may be based on incomplete data and/or may utilize image flow heuristics configured to hypothesize the existence and/or orientation of occluded parts of the hand.

Hand recognizer module 302 may be configured to output data indicating when hands visually detected in sensing space 210 match one or more user hand reference models stored in hand reference data store 304. Hand recognizer module 302 may be configured to provide output to gesture recognizer module 306, including output indicating that a match has been identified and/or data representative of a generated vector of hand reference points H at time t.

Gesture recognizer module 306 may be configured to detect hand gestures based on data representative of sequences of detected hand configurations, which may be represented by vectors of hand reference points H received from hand recognizer module 302. In certain embodiments, gesture recognizer module 306 may be configured to perform an isochronous transformation function g( ) that converts sequences of hand objects into recognizable gestures. For example, a given gesture G that began at time t and continued through time t+n may be described by $G_{t+n}=g([H_t, H_{t+n}], R_g)$, where $R_g$ represents gesture reference models stored in gesture reference data store 308.

The function g( ) may be computed in any way suitable for converting sequences of visually detected hand objects into recognizable gestures. In certain embodiments, for example, an execution of function g( ) may include comparing a sequence of hand object vectors $H_t$ through $H_{t+n}$ with reference gestures stored in gesture reference data store 308 to identify a match. When a match is identified, gesture recognizer module 306 may generate and output data representative of the gesture G to command generator module 310.

Command generator module 310 may be configured to identify one or more user input commands based on data representative of gestures, which may include data representative of a gesture G received from gesture recognizer module 306. Command generator module 310 may identify a command C associated with a gesture G by using data representative of the gesture G to identify command C in a lookup table that provides a mapping of gestures to corresponding user input commands. This may be accomplished by command generator module 310 executing a lookup function c( ) to identify command C based on gesture G and a command reference table $R_c$ stored in command reference data store 312 as described by $C=c(G, R_c)$.

Figure 5:
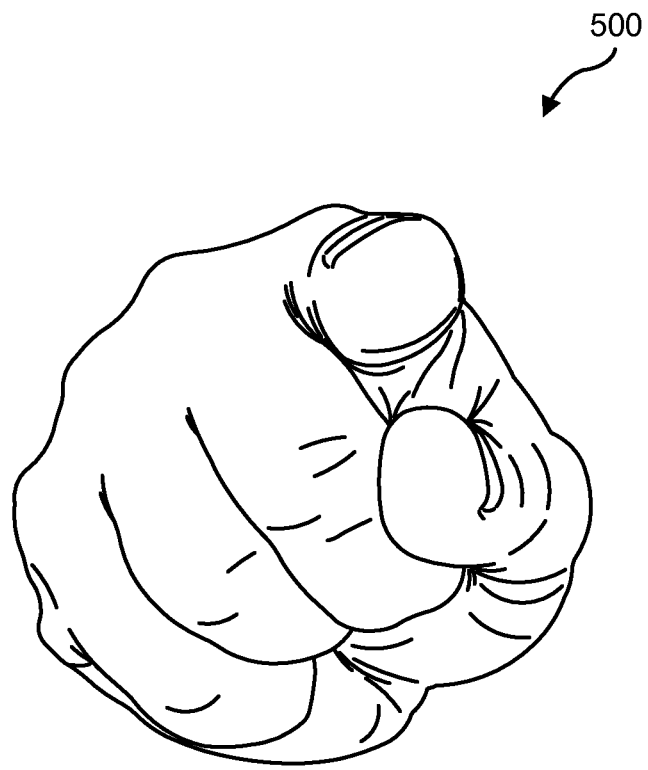
FIG. 5 illustrates an exemplary hand gesture that may be associated with cursor projection according to principles described herein.

As mentioned above, specific spatial input such as a predefined hand gesture may be associated with a user request for projection of a cursor onto a display screen. FIG. 5 illustrates an exemplary hand gesture 500 that may be predefined as being associated with a user request for projection of a cursor on a display device. As shown in FIG. 5, hand gesture 500 may include a hand of a user arranged such that the index finger of the hand is pointed at a display screen. The view shown in FIG. 5 may represent a perspective of a camera configured to visually detect spatial input provided within a physical user space.

When a user acts out hand gesture 500 shown in FIG. 5 within a physical user space that is being monitored for detection of spatial input, system 100 may detect hand gesture 500 and identify and apply an associated input command such as a user request for cursor projection onto a display screen. Hand gesture 500 shown in FIG. 5 is illustrative only. Other spatial input may be associated with a user request for cursor projection in other embodiments.

System 100 may apply an input command requesting projection of one or more cursors onto a display screen by initiating a feed of data representative of spatial input detected by spatial input subsystem 104 to cursor projection subsystem 106 for use in mapping the spatial input to one or more positions on the display screen. As mentioned above, cursor projection subsystem 106 may be configured to map the spatial input to one or more positions on the display screen based on at least one of a plane projection heuristic and a vector projection heuristic. Each of these heuristics, which may specify, perform, and/or control one or more of the cursor projection operations disclosed herein, will now be described in detail.

For cursor projection based on a plane projection heuristic, cursor projection subsystem 106 may be configured to project a virtual plane within a physical user space in which spatial input may be detected. The projected virtual plane, which may be an invisible plane positioned at a comfortable distance in front of a user who is located in the physical user space, may represent a virtual projection of a physical display screen into the physical user space. The user may place and/or move an object, such as the tip of the index finger shown in FIG. 5, on the virtual plane. A position of the user's fingertip on the virtual plane may be detected by spatial input subsystem 104 and used by cursor projection subsystem 106 to determine a position on a display screen at which a cursor is to be placed. Accordingly, the user may control placement and/or movement of a cursor on the display screen by placing and/or moving his or her finger tip on or across the projected virtual plane.

Figure 6:
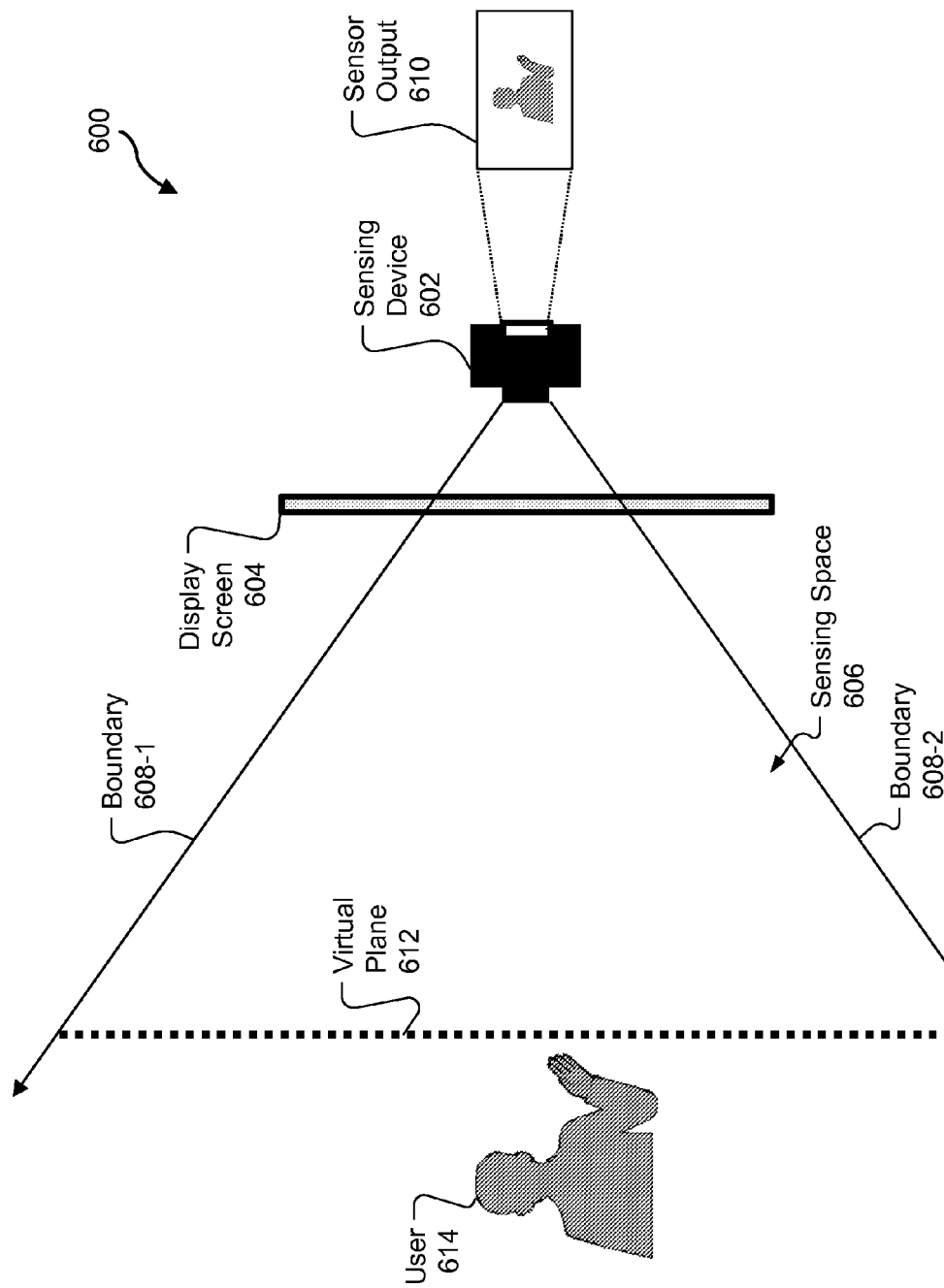
FIG. 6 illustrates an exemplary plane projection implementation of the system of FIG. 1 according to principles described herein.

To illustrate, FIG. 6 shows a view of an exemplary plane-projection-based implementation 600 of system 100 in which a sensing device 602 positioned relative to a display screen 604 may be configured to detect spatial input within a sensing space 606 defined by peripheral boundaries 608 (e.g., boundaries 608-1 and 608-2) of sensing device 602, which may generate sensor output 610 representing the detected spatial input.

A virtual plane 612 may be projected within sensing space 606 at any distance from display screen 604 that is within range of sensing device 602. The boundaries of virtual plane 612 may be defined by peripheral boundaries 608 of sensing device 602 and the distance of virtual plane 612 from display screen 604 and/or sensing device 602. The distance of virtual plane 612 from display screen 604 and/or sensing device 602 may be determined based on the distance of a user 614 from display screen 604 and/or sensing device 602. For example, sensing device 602 may detect user 614 within the sensing space 606, and system 100 may project virtual plane 612 at a specific distance from display screen 604 and/or sensing device 602 such that virtual plane 612 is a comfortable distance in front of user 614. Hence, the position of virtual plane 612 with respect to display screen 604 may dynamically shift (e.g., shift closer to or farther from display screen 604) depending on the position of user 614 within sensing space 606. Virtual plane 612 is normally projected such that its orientation is parallel to display screen 604. Such an orientation may help facilitate mapping of positions on virtual plane 612 to positions on display screen 604.

User 614 may provide spatial input on or across virtual plane 612. For example, user 614 may place a fingertip at a position on virtual plane 612. System 100 may detect the fingertip at the position on virtual plane 612, map the position of the fingertip on virtual plane 612 to a cursor position on display screen 604, and execute an operation based on the cursor position (e.g., display a cursor at the position on the display screen 604). In addition, the user 614 may move his or her fingertip across virtual plane 612 to cause the cursor to be moved in corresponding fashion on display screen 604. If the user 614 moves his or her fingertip outside of the boundaries of virtual plane 612 (e.g., outside of peripheral boundaries 608 of sensing space 606), the fingertip will not be detected by sensing device 602 and will not produce a display of a valid cursor on display screen 604.

Positions on virtual plane 612 may be mapped to positions on display screen 604 in any suitable way specified by the plane projection heuristic. In certain embodiments, for example, virtual plane 612 may include an array of positions on virtual plane 612 that may be mapped to a sensor array associated with sensing device 602. The sensor array may be mapped to an output array associated with sensor output 610 (e.g., an output array representing output of sensing device 602, such as an image array output by a camera sensing device 602), and the output array may be mapped to a display array associated with display screen 604. The display array may correspond with positions on display screen 604. Accordingly, a position of a fingertip of user 614 on virtual plane 612, which may be defined as $P(x_p, y_p)$, may be used to determine a corresponding position on the sensor array, which may be defined as $S(x_s, y_s)$. The position on the sensor array may be used to determine a corresponding position on the output array, which may be defined as $O(x_o, y_o)$. The position on the output array may be used to determine a corresponding position on the display array, which may be defined as $D(x_d, y_d)$ and may indicate a position on a display screen at which a cursor may be displayed.

Figure 7:
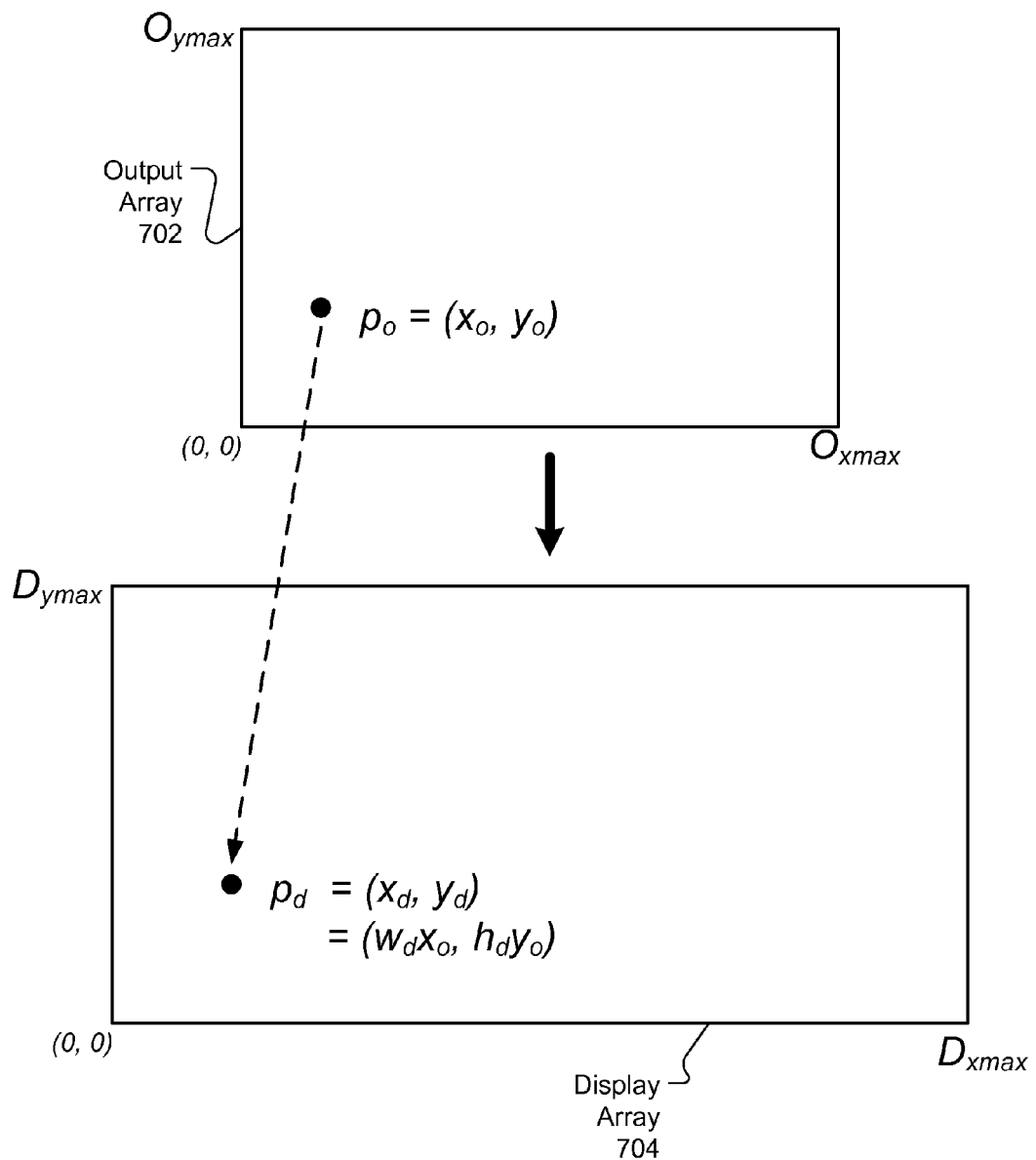
FIG. 7 illustrates an exemplary mapping of a position in a sensor output array to a position in a display array according to principles described herein.

Various mapping heuristics may be defined by plane projection heuristic and used to map positions between the arrays. To illustrate, in some examples, an output array (O) associated with sensor output 610 may map linearly to a display array (D) associated with display screen 604. In such examples, display width ($w_d$) and height ($h_d$) scale factors may be determined from the ratios of array widths and heights as follows: $w_d = D_{xmax}/O_{xmax}$ and $h_d = D_{ymax}/O_{ymax}$. It follows that if a position of a fingertip of the user 614 on virtual plane 612 is defined as $p_o = (x_o, y_o)$, the position of the cursor on display array (D) may be defined as $p_d = (x_d, y_d) = (w_d x_o, h_d y_o)$. FIG. 7 illustrates an exemplary mapping of a position ($p_o$) on an output array (O) 702 associated with sensor output 610 to a position ($p_d$) on a display array (D) 704 associated with display screen 604 based on the above-described plane-projection-based mapping heuristic.

Returning to FIG. 6, virtual plane 612 is shown to extend across sensing space 606 between boundaries 608 and parallel to display screen 604. In such examples, an entire cross-section of sensing space 606 parallel to display screen 604 may make up virtual plane 612 and may be configured to function as a single active region across which spatial input may be detected. In other examples, one or more active sub-regions may be projected at one or more distinct planar areas located within sensing space 606. A sub-region may include any subset of a cross-section of sensing space 606 parallel to display screen 604. Thus, a sub-region may form a virtual plane that is smaller than an entire cross-section of sensing space 606.

Figure 8:
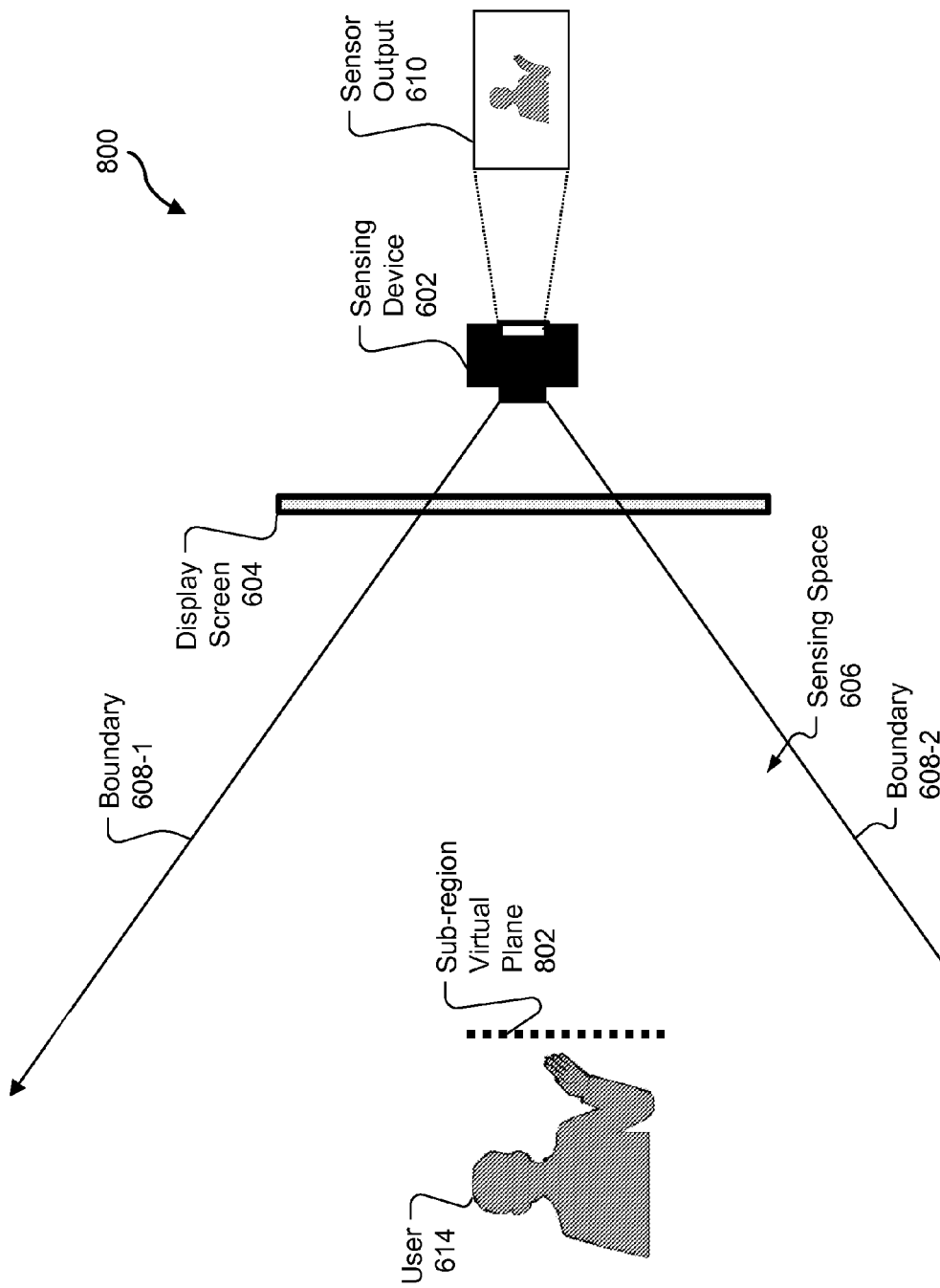
FIG. 8 illustrates another exemplary plane projection implementation of the system of FIG. 1 according to principles described herein.

FIG. 8 illustrates a view of another exemplary plane-projection-based implementation 800 of system 100. Implementation 800 is similar to implementation 600 of FIG. 6 except that in place of a projection of a full-size virtual plane 612 that extends between peripheral boundaries 608-1 and 608-2 as shown in FIG. 6, a sub-region virtual plane 802 is projected within sensing space 606. As shown, sub-region virtual plane 802 is a subset of a cross-section of sensing space 606 and does not extend all the way between peripheral boundaries 608-1 and 608-2.

A sub-region virtual plane such as sub-region virtual plane 802 of FIG. 8 may define an active input plane having a size that allows user 614 to conveniently and/or comfortably control one or more cursors on display screen 604, even when user 614 is located a significant distance away from display screen 604 and/or sensing device 602. At such a distance, a cross-section of sensing space 606 near user 614 may be larger than the space that is within comfortable reach of user 614. Such a configuration may be highly inconvenient and/or impractical for receiving spatial input from user 614. For example, if user 614 is sitting on a sofa a certain distance from a television display screen, user 614 may be required to physically move from one end of the sofa to the other end of the sofa in order to cause a cursor to move across the television display screen. To provide a more convenient and/or practical configuration for receipt of spatial input, sub-region virtual plane 802 may be projected and may have a size configured to accommodate convenient and/or comfortable spatial input provided by user 614.

Positions on sub-region virtual plane 802 may be mapped to positions on display screen 604 based on plane projection heuristic in any suitable way, including in any of the ways described above and/or based on a sequence of linear transformations. In certain embodiments, for example, sub-region virtual plane 802 may include an array of positions on sub-region virtual plane 802 that may be mapped to a sensor array associated with sensing device 602. The sensor array may be mapped to an output array associated with sensor output 610, and the output array may be mapped to a display array associated with display screen 604. The display array may correspond with positions on display screen 604. Accordingly, a position of a fingertip of user 614 on sub-region virtual plane 802, which may be defined as $P(x_p, y_p)$, may be used to determine a corresponding position on the sensor array, which may be defined as $S(x_s, y_s)$. The position on the sensor array may be used to determine a corresponding position on the output array, which may be defined as $O(x_o, y_o)$. The position on the output array may be used to determine a corresponding position on the display array, which may be defined as $D(x_d, y_d)$ and may indicate a position on a display screen at which a cursor may be displayed.

Figure 9:
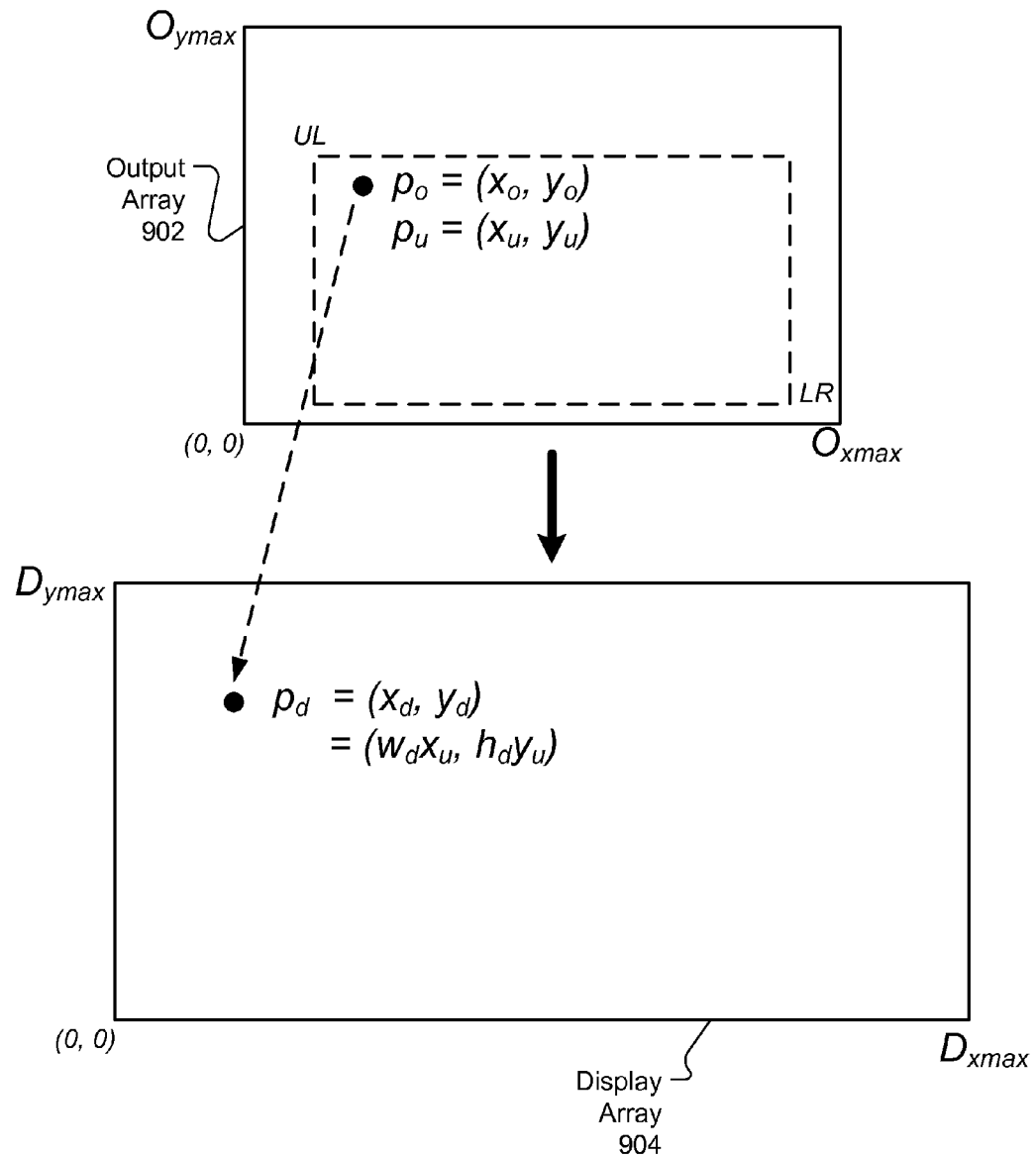
FIG. 9 illustrates another exemplary mapping of a position in a sensor output array to a position in a display array according to principles described herein.

Various mapping heuristics may be defined and used to map positions between the arrays. To illustrate, in some examples, an output array (O) associated with sensor output 610 may be used to determine coordinates of sub-region virtual plane 802. Given points of opposing corners of the output array (O), for example an upper left corner coordinate $(UL=(X_{left}, y_{top}))$ and a lower right corner coordinate $(LR=(x_{right}, y_{bottom}))$, user width $(w_u)$ and height $(h_u)$ scale factors may be determined from the ratios of array widths and heights as follows: $w_u=O_{xmax}/(x_{right}-x_{left})$ and $h_u=O_{ymax}/(y_{top}-y_{bottom})$. It follows that if a position of a fingertip of the user 614 on the output array (O) is defined as $p_o=(x_o, y_o)$, the relative position of the fingertip on sub-region virtual plane 802 may be defined as $p_u=(x_u, y_u)=(w_u(x_o-x_{left}), h_u(y_{top}-y_o))$. The position of the cursor on display array (D) may therefore be defined as $p_d=(x_d, y_d)=(w_d x_u, h_d y_u)=(w_d w_u(x_o-x_{left}), h_d h_u(y_{top}-y_o))$. FIG. 9 illustrates an exemplary mapping of a position $(p_o)$ in an output array (O) 902 associated with sensor output 610 to a position $(p_d)$ in a display array (D) 904 associated with display screen 604 based on the above-described plane-projection-based mapping heuristic as applied to sub-region virtual plane 802.

In any of the computations described above, the direction of the x-axis may be reversed or a direction reversal factor may be introduced such that from the perspective of user 614, leftward hand movements guide a cursor to the left on display screen 604, and rightward hand movements guide the cursor to the right on display screen 604.

Cursor projection subsystem 106 may be configured to provide one or more calibration modes and/or tools configured to facilitate user calibration of a plane projection heuristic, including calibration of one or more virtual planes and their mappings to a display screen. Accordingly, user 614 may provide input to configure a virtual plane in a way that accounts for user preferences, abilities, and/or location. User calibration tools may be especially useful for facilitating user definition of sub-region virtual planes.

In certain embodiments, for example, cursor projection subsystem 106 may be configured to execute a calibration mode configured to facilitate a calibration of a plane projection heuristic. Cursor projection subsystem 106 may be configured to execute the calibration mode in response to any predefined event. For example, a calibration tool or an option to launch a calibration tool may be automatically presented for use by user 614 in response to a detection of spatial input that is associated with a request for projection of a cursor on display screen 604. For instance, user 614 may act out a predefined hand gesture, such as by waving a hand back and forth with the palm of the hand facing display screen 604, and, in response, a calibration tool or an option to launch a calibration tool may be automatically presented for use by user 614 to calibrate a sub-region virtual plane.

The calibration tool may be presented in any form suitable for use by user 614 to calibrate or re-calibrate a virtual plane. For example, system 100 may present one or more calibration prompts configured to guide user 614 through a calibration dialog with system 100. Such prompts may be audible and/or visual instructions configured to direct user 614 to act out one or more gestures that may be used by system 100 to define a virtual plane. In some examples, the visual instructions may be presented on display screen 604 and may depict gestures to be acted out by user 614 to define a virtual plane. When user 614 acts out one or more gestures in the context of the calibration dialog during execution of the calibration mode, system 100 may detect the user input gestures for calibrating a virtual plane, and define the virtual plane based on the detected gestures. The calibration tool may be further configured to notify user 614 if a hand of user 614 leaves sensing space 606 during the calibration dialog.

As an example, an exemplary calibration tool may be configured to direct user 614 to act out gestures to physically provide a spatial indication of one or more boundary locations of a virtual plane. For instance, user 614 may be directed to act out gestures to physically mark opposing corners of a virtual plane (e.g., an upper left corner defined as $UL=(x_{left}, y_{top})$ and a lower right corner defined as $LR=(x_{right}, y_{bottom})$). To illustrate, in a user calibration dialog, user 614 may be directed to physically stretch his or her arm to a comfortable upper left point and act out a predefined gesture (e.g., snapping fingers) to mark that position as the upper left corner of a virtual plane. User 614 may then be directed to similarly mark the lower right corner of the virtual plane. Corner positions marked in this manner may be used by cursor projection subsystem 106 to define a rectangle-shaped virtual plane, which may be a sub-region virtual plane that represents a space in which user 614 may conveniently and/or comfortable provide spatial input for detection and use by system 100.

The above-described example is illustrative only. Other suitable spatial input may be defined for use by user 614 to define a virtual plane. For example, system 100 may direct user 614 to physically draw a shape (e.g., a rectangle, oval, or circle) of a virtual plane. Other predefined spatial input may be used for calibration of a virtual plane in other embodiments.

In response to user input received during execution of the calibration mode, cursor projection subsystem 106 may define a virtual plane (e.g., a sub-region virtual plane) based on the user input and calibrate the plane projection heuristic for mapping of the virtual plane to display screen 604. The above-described calibration may be repeated to calibrate multiple sub-region virtual planes for concurrent use in detecting and mapping spatial input to display screen 604.

Cursor projection subsystem 106 may be configured to support isomorphic or polymorphic plane projection. In isomorphic plane projection, display screen positions may map to virtual plane positions on a one-to-one basis. Hence, a position on display screen 604 may map to only one position within sensing space 606. Accordingly, isomorphic plane projection may be suitable for use when only a single virtual plane is active.

Figure 10:
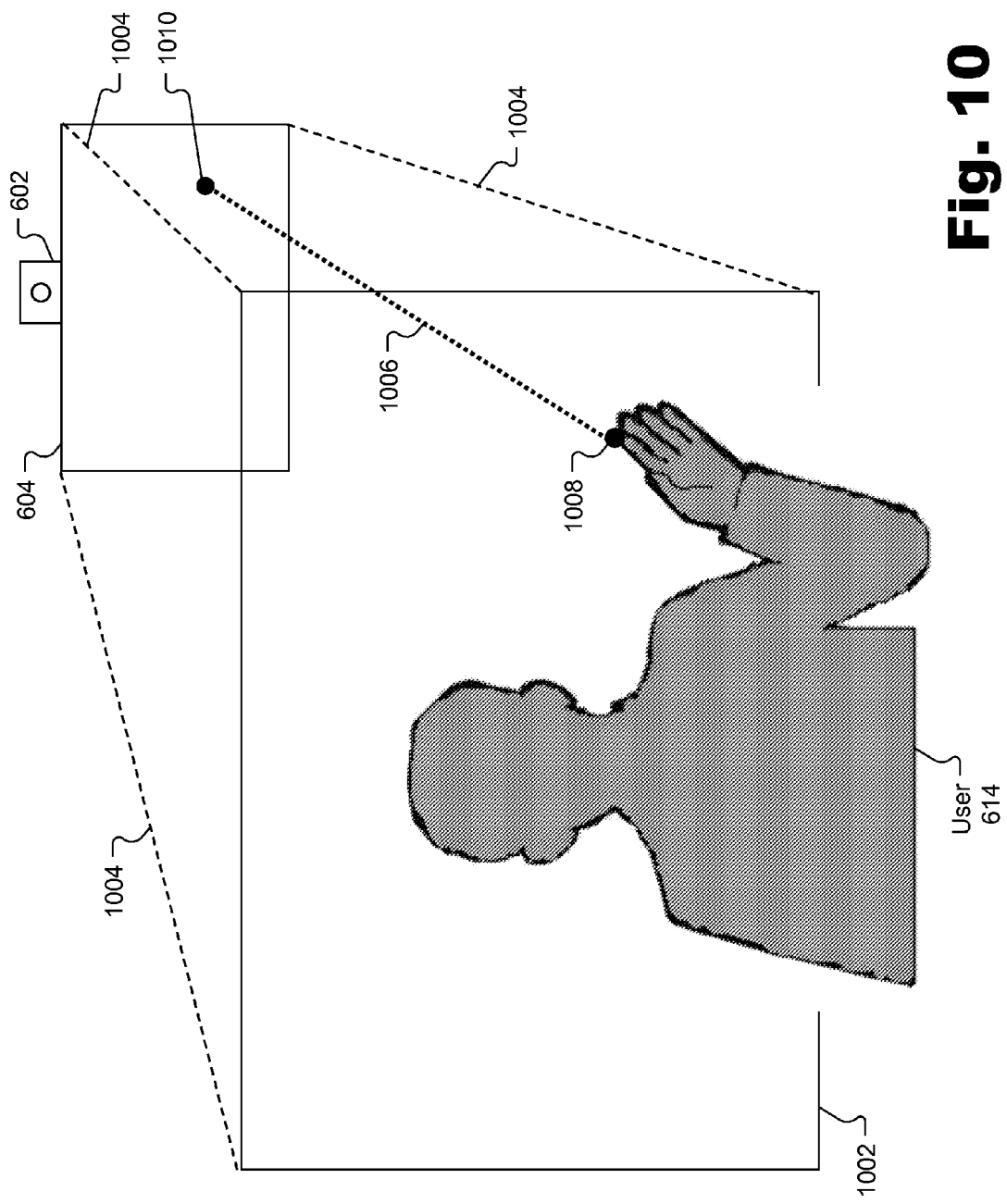
FIG. 10 shows an example of isomorphic plane projection according to principles described herein.

To illustrate, FIG. 10 shows an example of isomorphic plane projection. As shown, user 614 may provide spatial input on a virtual plane 1002, which may be a full-size virtual plane or a sub-region virtual plane as described above. Positions on virtual plane 1002 may be mapped to positions on display screen 604 based on a plane projection heuristic and on a one-to-one basis as illustrated by the dashed lines in FIG. 10. Dashed lines 1004 may represent one-to-one mapping of corner positions of virtual plane 1002 with respective corner positions of display screen 604. Dashed line 1006 may represent a one-to-one mapping of a position 1008 indicated by user 614 on virtual plane 1002 with a position 1010 on display screen.

In polymorphic plane projection, display screen positions may map to positions within sensing space 606 on a one-to-many basis. Hence, a position on display screen 604 may map to multiple positions within sensing space 606. Accordingly, polymorphic plane projection may be suitable for use when multiple user inputs for cursor projection are provided within sensing space 606, such as when multiple users are operating in discrete sub-region virtual planes within sensing space and/or when multiple inputs are provided on a single active virtual plane (e.g., when user 612 uses both hands and/or multiple fingers to indicate multiple positions on virtual plane 1002).

Figure 11:
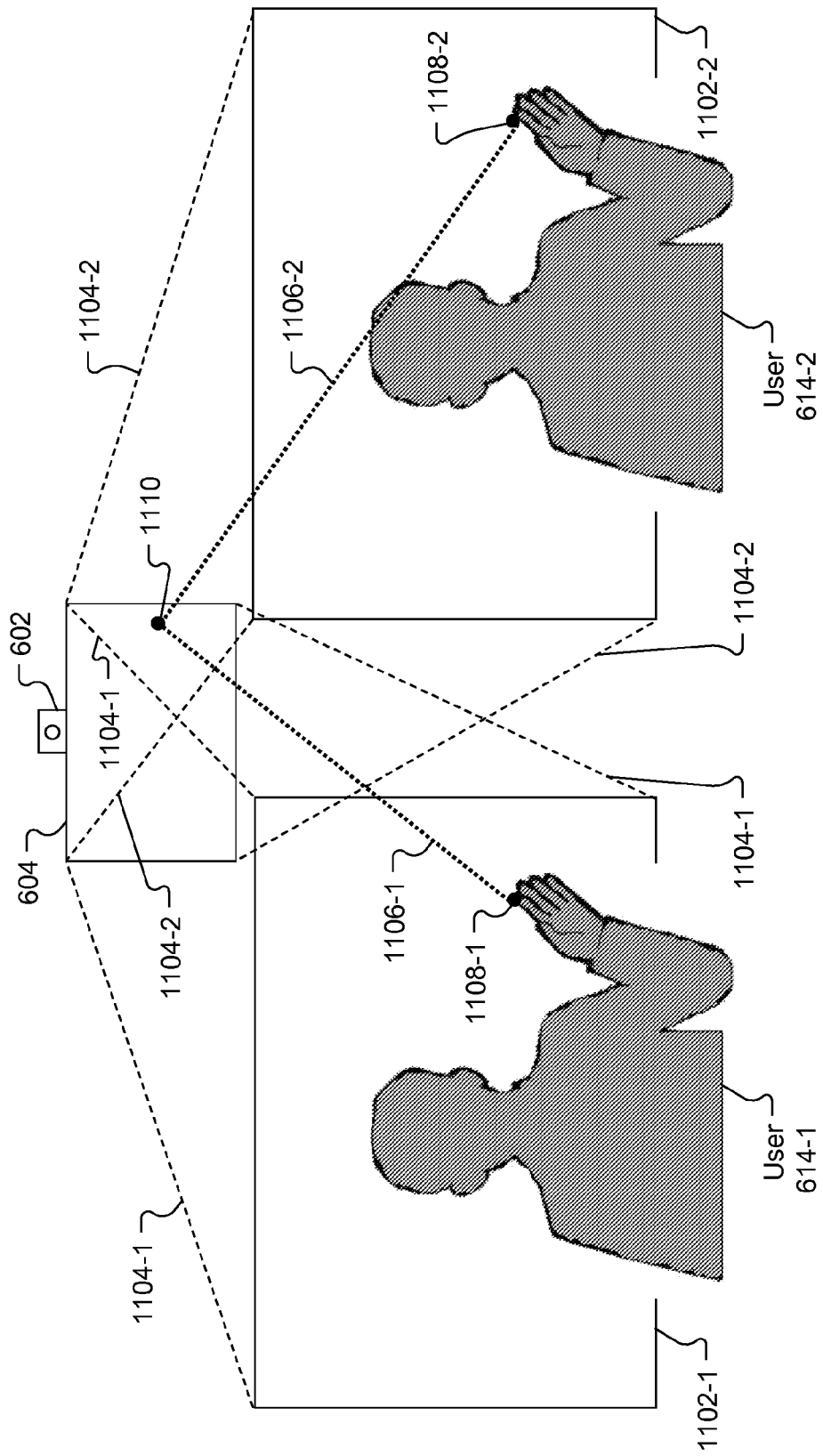
FIG. 11 shows an example of polymorphic plane projection according to principles described herein.

To illustrate, FIG. 11 shows an example of polymorphic plane projection. As shown, two users 614-1 and 614-2 may provide spatial input on their sub-region virtual planes 1102-1 and 1102-2, respectively. Positions on sub-region virtual plane 1102-1 may map to positions on display screen 604 as illustrated by dashed lines connecting sub-region virtual plane 1102-1 to display screen 604 in FIG. 10. Dashed lines 1104-1 may represent mappings of corner positions of sub-region virtual plane 1102-1 with respective corner positions of display screen 604. Dashed line 1106-1 may represent a mapping of a position 1108-1 indicated by user 614-1 on sub-region virtual plane 1102-1 with a position 1110 on display screen 604. In addition, positions on sub-region virtual plane 1102-2 may map to positions on display screen 604 as illustrated by dashed lines connecting sub-region virtual plane 1102-2 to display screen 604 in FIG. 10. Dashed lines 1104-2 may represent mappings of corner positions of sub-region virtual plane 1102-2 with respective corner positions of display screen 604. Dashed line 1106-2 may represent a mapping of a position 1108-2 indicated by user 614-2 on sub-region virtual plane 1102-2 with position 1110 on display screen 604.

While sub-region virtual planes 1102-1 and 1102-2 are illustrated as being positioned at entirely distinct planar area locations within sensing space 606, this is illustrative only. Other active sub-region virtual planes may overlap and/or may be located at various distances from display screen 604 in other examples.

Figure 12:
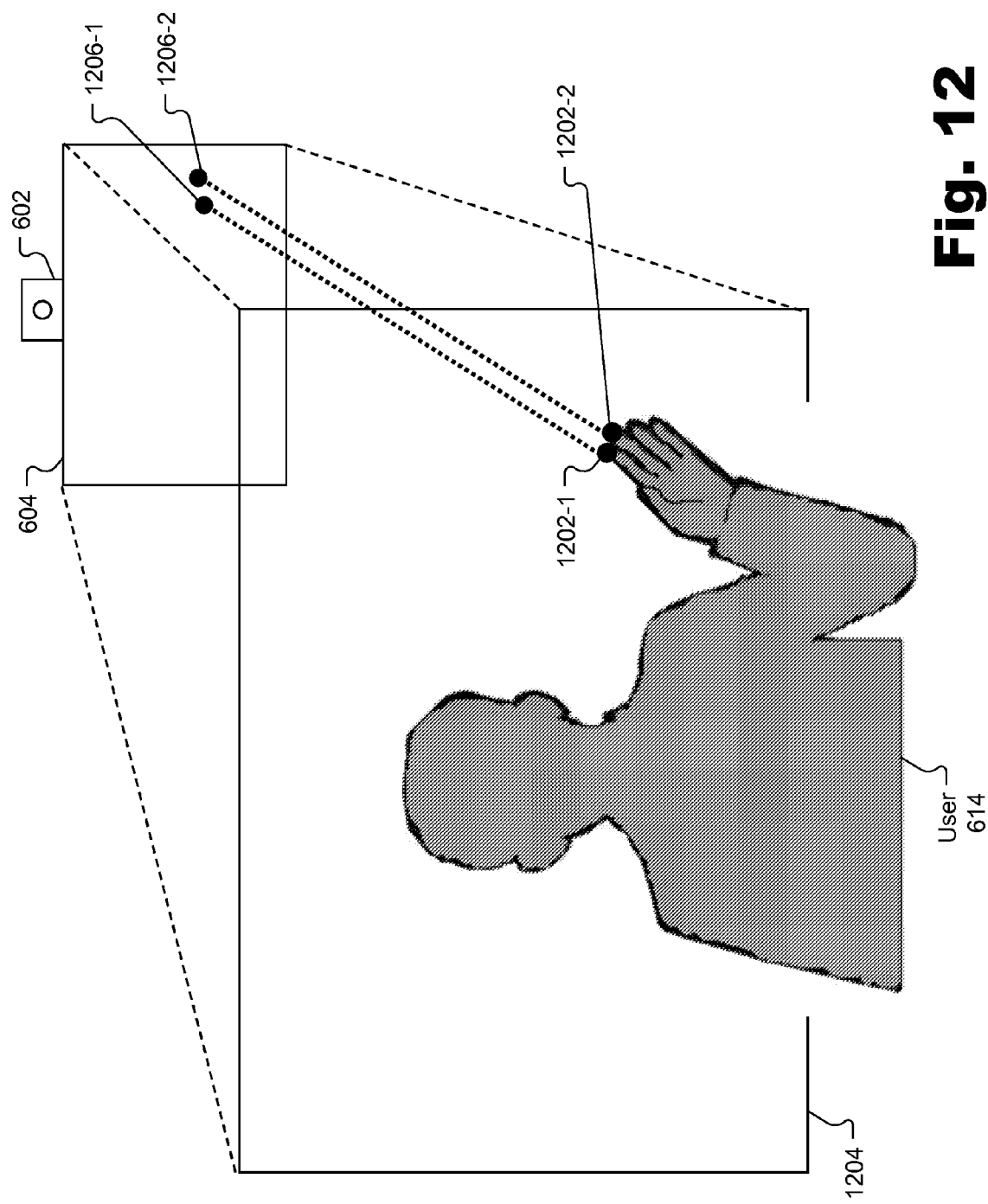
FIG. 12 illustrates an example of a mapping of multiple positions on a virtual plane to multiple cursor positions on a display screen according to principles described herein.

In certain embodiments, system 100 may be configured to support concurrent mapping of multiple positions on a virtual plane to multiple respective positions on display screen 604. For example, cursor projection subsystem 106 may be configured to map multiple digits of a user's hand to multiple corresponding cursor positions on display screen 604. FIG. 12 illustrates an example of a mapping of multiple positions 1202 (e.g., positions 1202-1 and 1202-2) on a virtual plane 1204, which may be a full-size virtual plane or sub-region virtual plane as described above, to multiple corresponding cursors positions 1206 (e.g., 1206-1 and 1206-2) on display screen 604.

The capability to concurrently map multiple input positions on a virtual plane to multiple cursor positions on display screen 604 based on a plane projection heuristic may support a wide range of input combinations that may be applied to control operation of one or more applications executed by system 100. As an example, a user may position one or both of his or her hands such that one or more of the digits of the hand(s) are positioned on a virtual plane. The positions may be detected and mapped to multiple cursor positions on display screen 604. The cursor positions and/or movement of the cursor positions may be used to control operations of an application, such as a virtual piano keyboard or guitar application. Accordingly, the user may move one or more digits of his or her hand(s) across the virtual plane to control operations of the application, which may simulate the playing of a piano, guitar, keyboard, or other musical instrument, for example. As another example, spatial input on the virtual plane may be used to operate a virtual text keyboard, virtual numerical keypad, virtual calculator, machinery, or video game. These examples are illustrative only. Concurrent multiple-position input and mapping may be applied to other applications in other examples.

In certain embodiments, a relationship of multiple cursors on a display screen may be configured to trigger execution one or more predetermined operations. For example, if a user utilizes two digits of his or her hand to indicate two positions on a virtual plane, system 100 may map the two positions on the virtual plane to two respective positions on display screen 604. System 100 may be configured to detect when the two positions on display screen 604 satisfy one or more criteria indicative of a predefined relationship. When the predefined relationship is determined to exist, system 100 may initiate one or more predetermined operations. For instance, when the two positions on display screen 604 come together at a common position or within a minimum screen distance of one another (e.g., such as may happen if the user touched his or her thumb and index finger together on the virtual plane), system 100 may respond by initiating one or more predetermined operations, such as selecting an object displayed proximate the common position on display screen 604.

For cursor projection based on a vector projection heuristic, in response to a detection of spatial input associated with a request for cursor projection, cursor projection subsystem 106 may identify predefined reference points on user 614 providing spatial input in sensing space 606, use the predefined reference points to determine a three-dimensional ("3D") vector (e.g., a vector in 3D space), and map the vector to a position on a display screen (e.g., by computing a point of intersection of the vector with the display screen and setting the intersection point as a cursor position on the display screen). An operation may be executed based on the determined cursor position on the display screen. For example, a cursor may be displayed at the position on the display screen.

For vector-based cursor projection, a three-dimensional sensing technology, such as stereo vision provided by two or more cameras, is typically used such that three-dimensional locations of predefined reference points may be detected and used to compute a vector formed by the reference points. In such technologies, the use of more sensing devices will generally increase the accuracy of the computed vector and therefore of the resulting cursor locations on the display screen.

Any spatial input having multiple reference points that may be detected and used to compute a vector may be used for vector-based cursor projection. For purposes of illustration, an example of spatial input in the form of a hand gesture having an index finger pointing at a display screen will now be described. However, other forms of spatial input may be used in other examples.

Figure 13A:
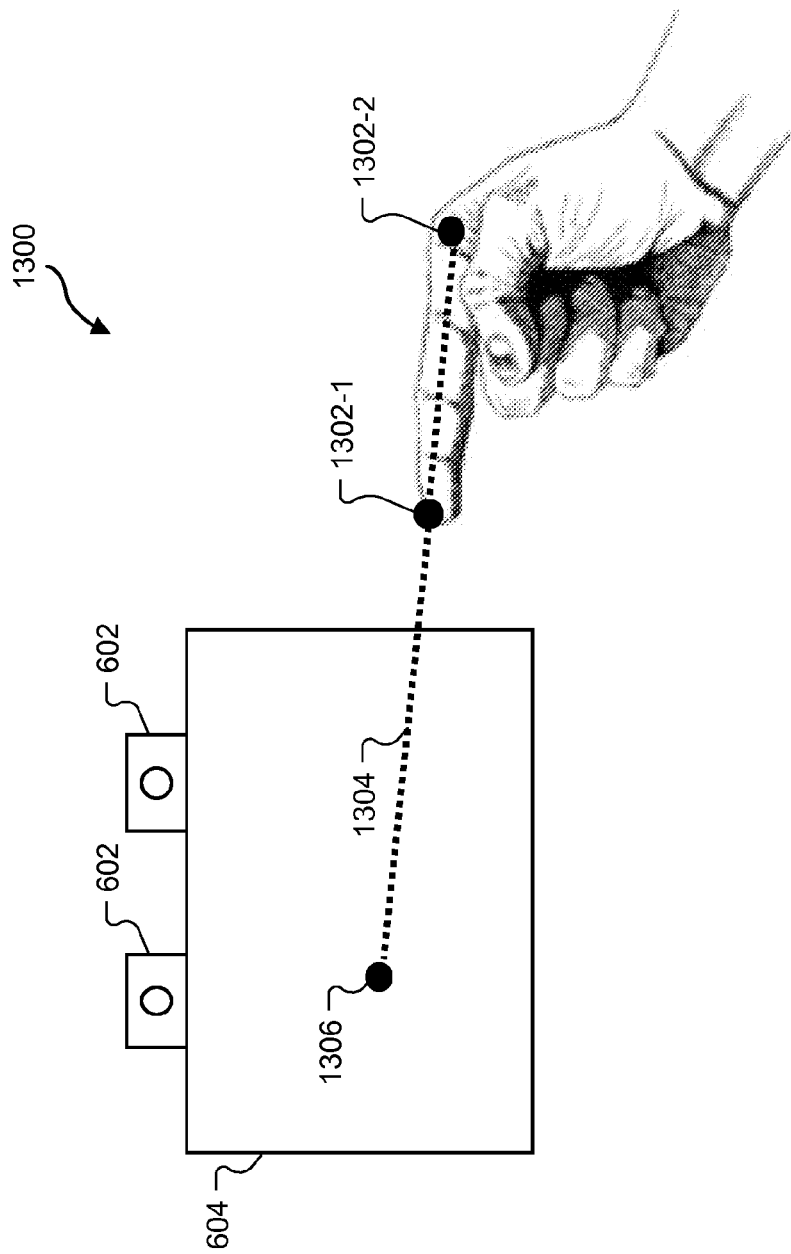
FIG. 13A illustrates an exemplary vector projection implementation of the system of FIG. 1 according to principles described herein.

FIG. 13A illustrates a view of an exemplary vector-projection-based implementation 1300 of system 100 in which multiple sensing devices 602 positioned relative to display screen 604 may be configured to detect spatial input. Based on the spatial input, cursor projection subsystem 106 may identify locations of predefined reference points 1302 (e.g., reference points 1302-1 and 1302-2) within a physical user space and use the locations of the reference points 1302 to determine a vector 1304. As shown in FIG. 13A, vector 1304 may project from reference point 1302-1 (e.g., the tip of the index finger) toward display screen 604 such that vector 1304 intersects display screen 604 at cursor position 1306. Cursor projection subsystem 106 may map vector 1304 to cursor position 1306 on display screen 604 by computing a point at which vector 1304 intersects display screen 604 and setting the intersection point as cursor position 1306.

To illustrate, if reference points 1302-1 and 1302-2 are referred to as $P_{u1}$ and $P_{u2}$, respectively, then the locations of reference points 1302-1 and 1302-2 may be defined as $P_{u1}=(x_{u1}, y_{u1}, z_{u1})$ and $P_{u2}=(x_{u2}, y_{u2}, z_{u2})$, respectively. If cursor position 1306 is similarly referred to as $P_d$, the location of cursor position may be defined as $P_d=(x_d, y_d, z_d)=(x_d, y_d, 0)$ where $z_d=0$ because the depth is zero at the intersection of vector 1304 with display screen 604. With the locations of reference points 1302-1 and 1302-2 detected and values for $x_{u1}, y_{u1}, z_{u1}, x_{u2}, y_{u2}$, and $z_{u2}$ known, values for $x_d$ and $y_d$ may be determined. Using a 3D equation for a line, $(x_d, y_d, z_d) = (x_{u1}, y_{u1}, z_{u1}) + r((x_{u2}, y_{u2}, z_{u2}) - + (x_{u1}, y_{u1}, z_{u1}))$, system 100 may solve for r as follows:

$$z_d = z_{u1} + r(z_{u2} - z_{u1})$$

$$0 = z_{u1} + r(z_{u2} - z_{u1})$$

$$r = -z_{u1}/(z_{u2} - z_{u1}).$$

System 100 may then solve for $x_d$ and $y_d$ to determine the location of cursor position 1304 on display screen 604 as follows:

$$x_d = x_{u1} + r(x_{u2} - x_{u1})$$

$$x_d = x_{u1} + (-z_{u1}/(z_{u2} - z_{u1}))(x_{u2} - x_{u1})$$

$$y_d = y_{u1} + r(y_{u2} - y_{u1})$$

$$y_d = y_{u1} + (-z_{u1}/(z_{u2} - z_{u1}))(y_{u2} - y_{u1}).$$

FIG. 13B illustrates a graphical representation 1350 of display screen 604 and locations of $P_{u1}$, $x_{u1}$, $y_{u1}$, $z_{u1}$, $P_{u2}$, $x_{u2}$, $y_{u2}$, and $z_{u2}$, $P_d$, $x_d$, and $y_d$ within a 3D coordinate system 1352.

In the example illustrated in FIG. 13A, reference points 1302-1 and 1302-2 represent the tip of the index finger of a user's hand (i.e., the end of the distal phalanx of the index finger) and another part of the index finger, which in this example is the beginning of the index finger (i.e., the metacarpophalangeal joint of the index finger), respectively. This is illustrative only. Other reference points 1302 may be used in other embodiments. For example, reference point 1302-1 may be associated with the tip of a pointing finger of a user's hand and reference point 1302-1 may be associated with another part of the same finger or another part of the user's hand. As another example, reference point 1302-1 may be associated with the tip of the index finger of a user's hand and reference point 1302-2 may be associated with one of the user's eyes. In such embodiments, system 100 may be configured to detect the tip of the index finger of the user's hand and one of the user's eyes to identify references points 1302-1 and 1302-2 corresponding to the tip of the index finger and the eye, respectively, and to use reference points 1302-1 and 1302-2 to determine a vector 1304 and an intersection of the vector 1304 with display screen 604. The intersection may be set as the cursor position, and a cursor may be optionally displayed at the cursor position. This may provide a user experience in which, from the user's perspective, the cursor may appear to follow the tip of the index finger of the user's hand.

In certain embodiments, the vector projection heuristic may be configured to support concurrent mapping of multiple spatial input vectors to multiple cursor positions on display screen 604. For example, cursor projection subsystem 106 may be configured to map multiple digits of a user's hand or hands to multiple corresponding cursor positions on display screen 604. For example, a user may point multiple digits at display screen 604, and system 100 may detect and identify predefined reference points associated with the multiple digits, use the predefined reference points to determine multiple vectors (e.g., one vector for each pointing digit), and map the vectors to positions on display screen 604. As another example, multiple users may concurrently provide spatial input pointing toward display screen 604, and system 100 may detect and identify predefined reference points associated with the spatial input, use the predefined reference points to determine multiple vectors (e.g., one vector for each pointing digit), and map the vectors to positions on display screen 604. The capability to concurrently map multiple vectors to multiple cursor positions on a display screen may support a wide range of input combinations that may be applied to control operations of one or more applications executed by system 100, including any of the multi-position operations and/or applications mentioned above.

Cursor projection subsystem 106 may be configured to provide one or more tools configured to facilitate user calibration of a vector projection heuristic during execution of a calibration mode. The tool(s) may be provided and/or the calibration mode executed in response to any predefined event, as described above. Accordingly, the user may provide input to configure the vector projection heuristic in a way that accounts for user preferences, abilities, and/or location.

The calibration tool may be presented during execution of the calibration mode and in any form suitable for use by the user to calibrate or re-calibrate a vector projection heuristic. For example, system 100 may present one or more calibration prompts configured to guide the user through a calibration dialog with system 100. Such prompts may be audible and/or visual instructions configured to direct the user to act out one or more gestures that may be used by system 100 to calibrate the vector projection heuristic. In some examples, the visual instructions may be presented on display screen 604 and may depict gestures to be acted out by the user.

As an example, an exemplary calibration tool may be configured to direct a user to act out a gesture of pointing an index finger of a hand at display screen 604, such as is shown in FIG. 13A. During execution of the calibration mode, system 100 may use the spatial input provided by the user to detect, identify, and use multiple reference points to determine and map multiple vectors to display screen 604. Multiple cursors associated with the positions at which the vectors intersect display screen 604 may be concurrently displayed on the display screen 604. With the cursors displayed, system 100 may provide the user with an option for selecting one of the cursors. The user may provide input indicating which of the cursors feels most comfortable and/or natural to the user. System 100 may receive the user input and calibrate the vector projection heuristic such that the vector projection heuristic defines, based on the user input, the reference points to be used for vector-based cursor projection.

Figure 14:
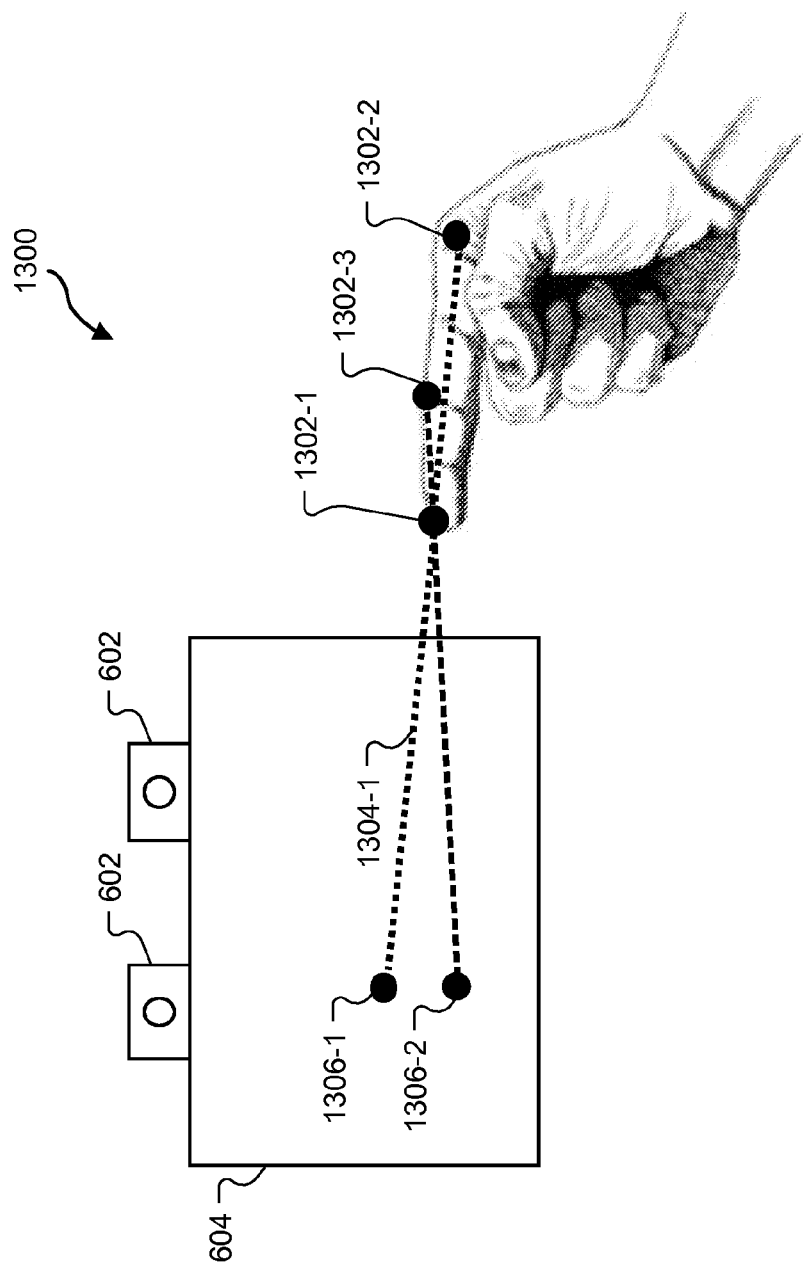
FIG. 14 shows a multi-cursor application of the vector projection implementation of FIG. 13A according to principles described herein.

To illustrate, FIG. 14 shows implementation 1300 during operation of a calibration mode in which reference points 1302-1 and 1302-2 are used to determine and map a first vector 1304-1 to a first cursor position 1306-1 on display screen 604 and reference points 1302-1 and 1302-3 are used to determine and map a second vector 1304-2 to a second cursor position 1306-2 on display screen 604. As shown, reference points 1302-2 and 1302-3 are associated with different parts of a user's hand and lead to generation of different vectors 1304-1 and 1304-2. With cursors displayed at positions 1306-1 and 1306-2, system 100 may prompt the user to provide input indicating a preference between the cursors. In response to a user selection of the displayed cursors, system 100 may calibrate a vector projection heuristic to utilize either reference point 1302-2 or 1302-3 together with reference point 1302-1 going forward, depending on which cursor the user selected. If the user selected the cursor displayed at position 1304-1, for example, system 100 may calibrate the vector projection heuristic to utilize reference point 1302-2 together with reference point 1302-1 going forward. Accordingly, a user may provide input that may be used to calibrate the vector projection heuristic to function in a way that feels most intuitive, natural, or comfortable to the user.

While FIG. 14 is described in a calibration context, this is illustrative only. System 100 may additionally or alternatively determine multiple vectors from spatial input and concurrently map the multiple vectors to multiple cursor positions on display screen 604 in other contexts, including during non-calibration runtime operation of cursor projection subsystem 106. Accordingly, a user may utilize a single pointing finger to provide input that is mapped to multiple cursor positions on display screen 604. The multiple cursor positions and/or relationships between the multiple cursor positions may be used by system 100 to control one or more operations of system 100, including for any of the multi-cursor-based operations mentioned above.

In certain embodiments, cursor projection subsystem 106 may be configured to selectively operate in accordance with either a plane projection heuristic or a vector projection heuristic. To this end, system 100 may be configured to provide a user with one or more tools that allow the user to select the heuristic to be used for cursor projection. Accordingly, the user may select whether a plane or vector projection heuristic will be used for cursor projection. Operation of system 100 based on a plane projection heuristic may be referred to as operation in a "plane projection mode," and operation of system 100 based on a vector projection heuristic may be referred to as operation in a "vector projection mode." In some examples, system 100 may be configured to toggle between operating in plane and vector projection modes (e.g., dynamically on-the-fly during an active cursor projection session or when no cursor projection session is active) in response to user input selecting a projection heuristic.

In certain embodiments, cursor projection subsystem 106 may be configured to operate in accordance with a plane projection heuristic and a vector projection heuristic concurrently. For example, cursor projection subsystem 106 may be configured to map detected spatial input to multiple cursor positions on a display screen based on both a plane projection heuristic and a vector projection heuristic. For example, when a user acts out a hand gesture such as the hand gesture 500 shown in FIG. 5, system 100 may detect and map the hand gesture 500 to a first cursor position on the display screen based on one of the plane projection heuristic and the vector projection heuristic and to a second cursor position on the display screen based on the other of the plane projection heuristic and the vector projection heuristic. For instance, system 100 may map the hand gesture 500 to a first cursor position based on a plane projection heuristic in any of the ways described above and to a second cursor position on the display screen based on a vector projection heuristic in any of the ways described above. Accordingly, the first cursor position may be determined based on a position of the fingertip of the index finger of the hand on a projected virtual plane as described above and the second cursor position may be determined based on a direction that the index finger is pointing as described above. In this or a similar manner, a translational position (e.g., in an XY plane oriented parallel to the display screen) and a rotational orientation (e.g., pitch rotation and/or yaw rotation) of a digit of a user's hand may be used to determine multiple cursor positions on a display screen.

In certain embodiments, cursor projection subsystem 106 may be configured to map spatial input to a cursor position on a display screen based on a combination of a vector projection heuristic and a plane projection heuristic. For example, cursor projection subsystem 106 may be configured to use a plane projection heuristic to map two degrees of translational movement on a plane oriented parallel to a display screen (i.e., translational movement of a user's hand and/or index finger along an x-axis and/or a y-axis that form the XY plane) and a vector projection heuristic to map two degrees of rotational movement (i.e., pitch rotation about the x-axis and yaw rotation about the y-axis). Accordingly, a combination of plane projection and vector projection heuristics may be used to determine cursor position in a way that allows and tracks up to four degrees of freedom of movement.

In addition, in some examples, one or two more degrees of freedom of movement may be tracked and used for cursor projection. For example, the three-dimensional sensing used for vector-based cursor projection may be leveraged and used to detect position and movement along a z-axis (an axis perpendicular to the display screen) to allow and track an additional degree of translational movement. Additionally or alternatively, an additional cursor may be mapped to the display screen and used to detect roll rotation such that an additional degree of rotational freedom of movement may be allowed and tracked. For instance, the tip of another digit of a user's hand may be used to determine a position of another cursor on the display screen. The positions of the first and second cursors on the display screen may be relatively fixed such that rotation of the user's hand and/or index finger about the z-axis may cause the second cursor to move about the first cursor in a radial manner. In this or a similar manner, system 100 may be configured to detect and use spatial input having up to six degrees of freedom of movement for cursor projection.

As mentioned, a relationship of multiple cursors on a display screen may be configured to trigger one or more predetermined operations. This may apply when system 100 projects multiple cursors based on both plane projection and vector projection heuristics. For instance, when a first cursor position determined based on a plane projection heuristic and a second cursor position determined based on a vector projection heuristic come together at a common position or within a minimum screen distance of one another (e.g., such as may happen if the index finger of a user is pointing at a display screen at an angle that is perpendicular to the display screen)), system 100 may respond by initiating one or more predetermined operations, such as selecting an object displayed proximate the common position on the display screen.

As mentioned, in certain embodiments, system 100 may be configured to provide a user with one or more tools that allow the user to select that either a vector projection heuristic or a plane projection heuristic be used for cursor projection. In certain embodiments, the tool(s) may also allow the user to select that both a vector projection heuristic and a plane projection heuristic be used concurrently for cursor projection. Accordingly, the user may select between the use of a vector projection heuristic, a plane projection heuristic, and a combination of both for cursor projection.

In certain embodiments, the concurrent use of a vector projection heuristic and a plane projection heuristic for cursor projection may be applied as a calibration tool configured to enable a user to concurrently experience vector and plane projection heuristics such that the user may select, based on the experience, which heuristic is to be used for cursor projection.

Figure 15:
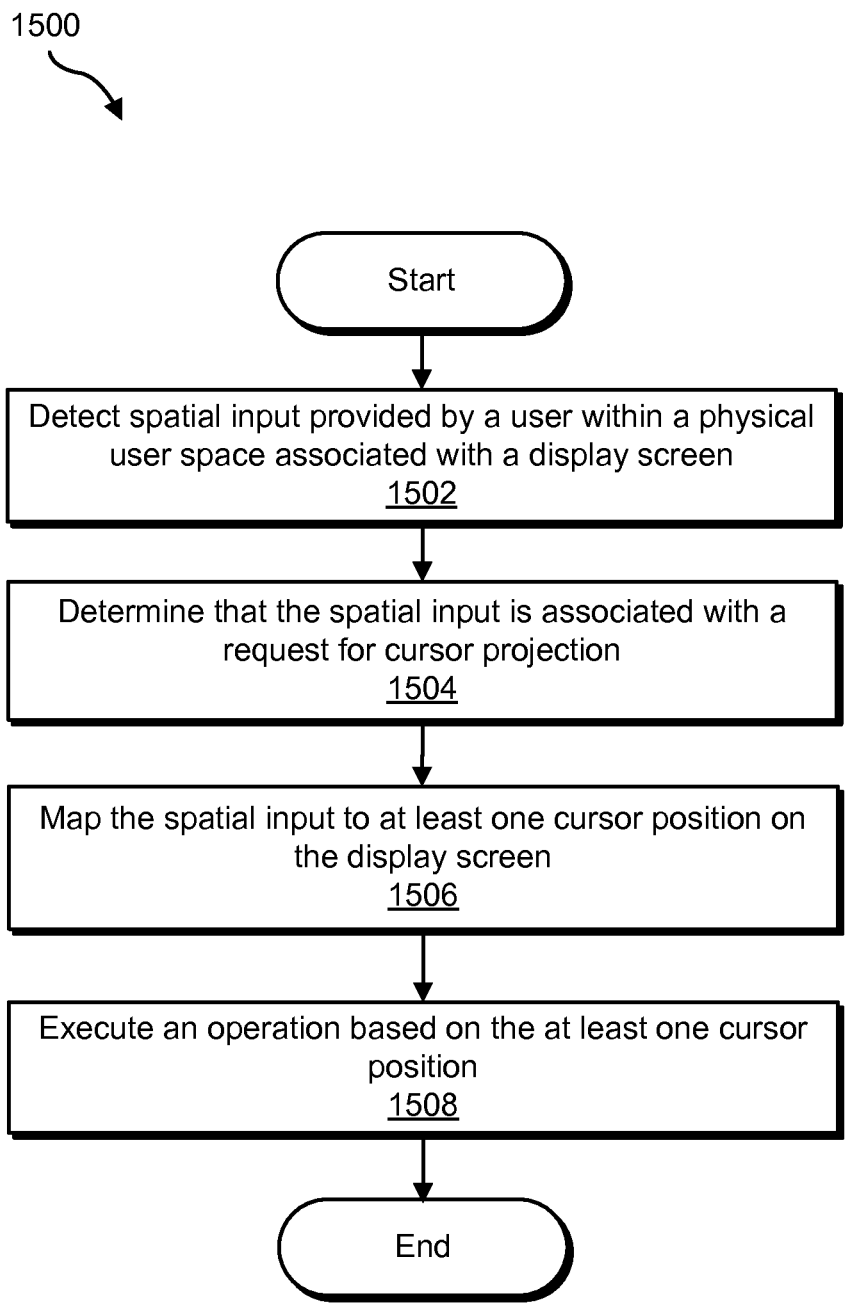
FIG. 15 illustrates an exemplary cursor projection method according to principles described herein.

FIG. 15 illustrates an exemplary spatial-input-based cursor projection method 1500. While FIG. 15 illustrates exemplary steps according to one embodiment, other embodiments may omit, add to, reorder, and/or modify any of the steps shown in FIG. 15. In certain embodiments, one or more of the steps shown in FIG. 15 may be performed by system 100.

In step 1502, spatial input provided by a user within a physical user space associated with a display screen is detected. Step 1502 may be performed in any of the ways described above.

In step 1504, a determination is made that the spatial input is associated with a request for cursor projection. Step 1504 may be performed in any of the ways described above.

In step 1506, the spatial input is mapped to at least one cursor position on the display screen. Step 1506 may be performed in any of the ways described above. For example, system 100 may map the spatial input to at least one cursor position based on at least one of a plane projection heuristic and a vector projection heuristic, which, alone or in combination, may be configured to direct mapping of the spatial input to at least one cursor position on the display screen in any of the ways described above.

In step 1508, an operation is executed based on the at least one cursor position. Step 1508 may be performed in any of the ways described above. For example, the operation may include displaying a cursor object at the cursor position on the display screen.

Figure 16:
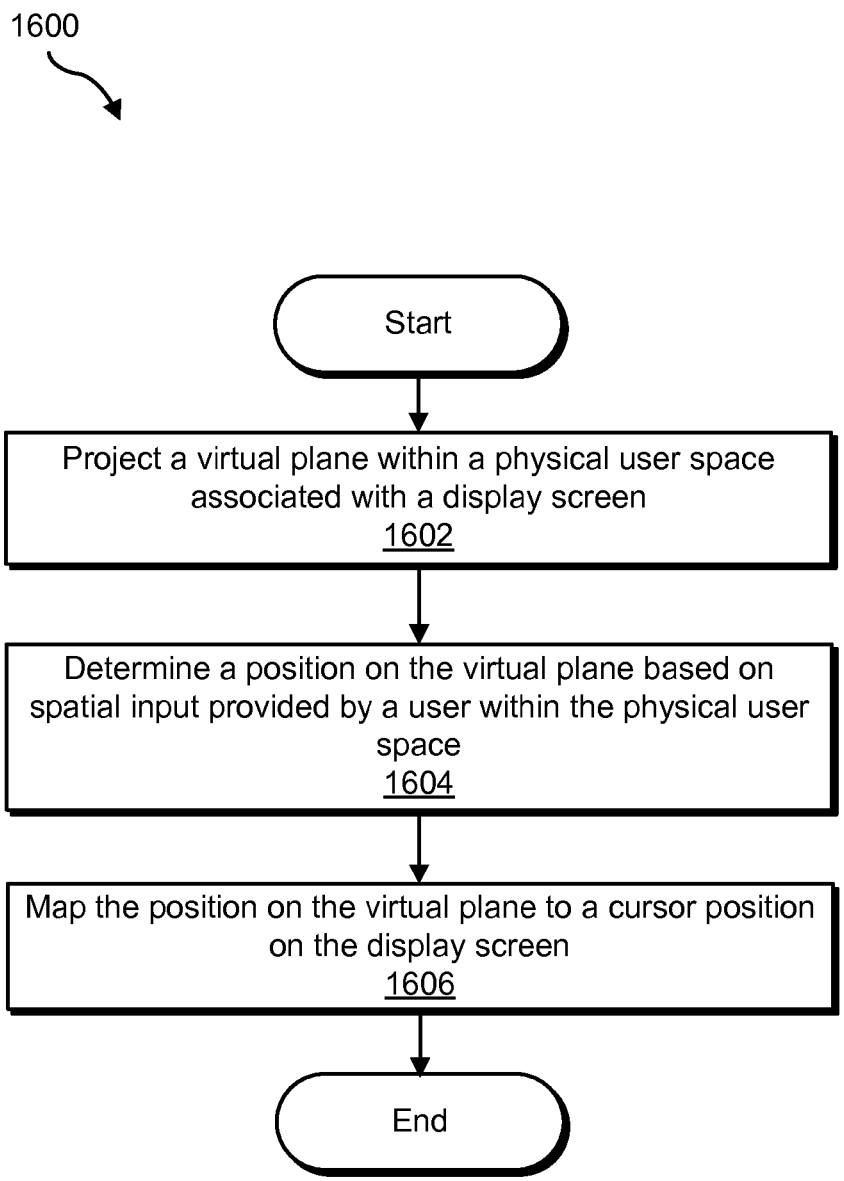
FIG. 16 illustrates an exemplary plane projection method according to principles described herein.

FIG. 16 illustrates an exemplary plane projection method 1600. While FIG. 16 illustrates exemplary steps according to one embodiment, other embodiments may omit, add to, reorder, and/or modify any of the steps shown in FIG. 16. In certain embodiments, one or more of the steps shown in FIG. 16 may be performed by system 100. In certain embodiments, step 1506 of FIG. 15 may comprise one or more of the steps shown in FIG. 16.

In step 1602, a virtual plane is projected within a physical user space associated with a display screen. Step 1602 may be performed in any of the ways described above.

In step 1604, a position on the virtual plane is determined based on spatial input provided by a user within the physical user space. Step 1602 may be performed in any of the ways described above.

In step 1606, the position on the virtual plane is mapped to a cursor position on the display screen. Step 1606 may be performed in any of the ways described above.

Figure 17:
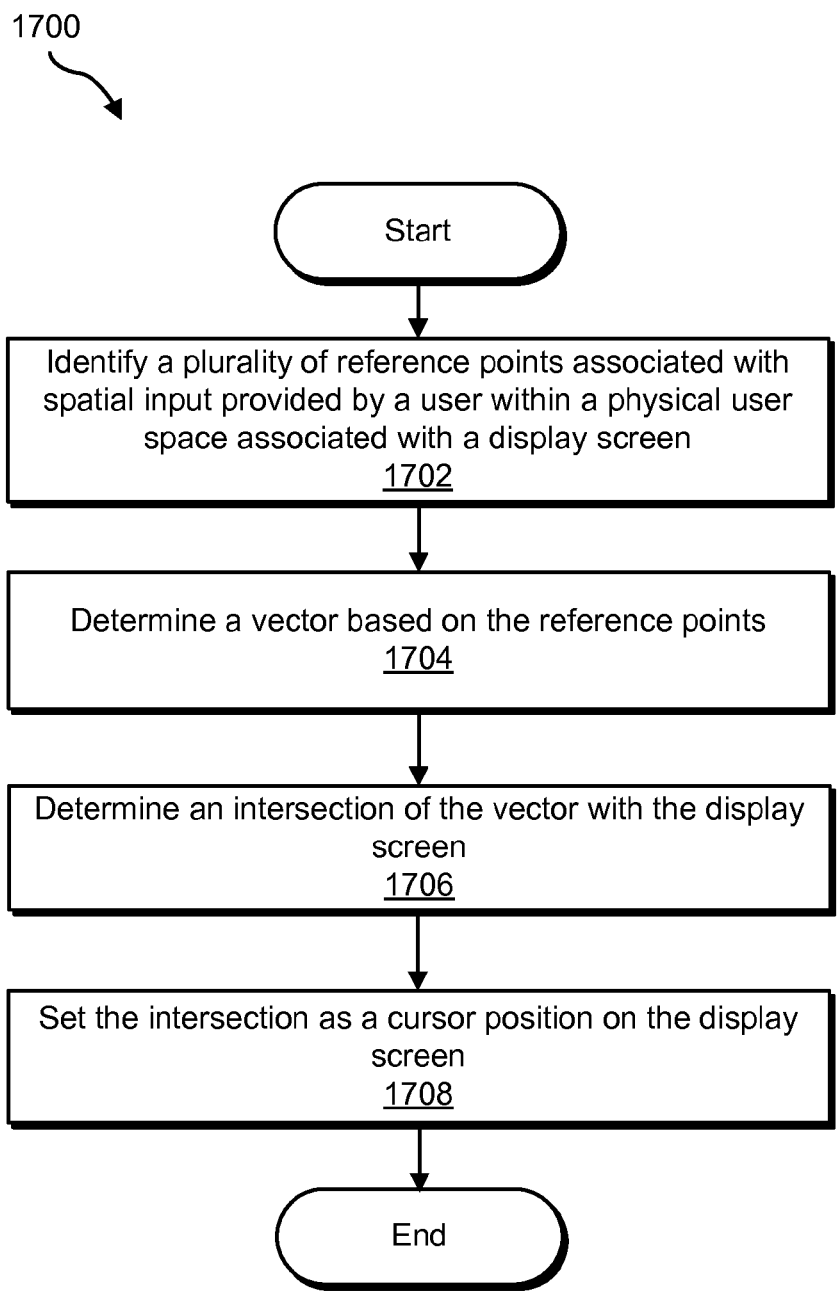
FIG. 17 illustrates an exemplary vector projection method according to principles described herein.

FIG. 17 illustrates an exemplary vector projection method 1700. While FIG. 17 illustrates exemplary steps according to one embodiment, other embodiments may omit, add to, reorder, and/or modify any of the steps shown in FIG. 17. In certain embodiments, one or more of the steps shown in FIG. 17 may be performed by system 100. In certain embodiments, step 1506 of FIG. 15 may comprise one or more of the steps shown in FIG. 17.

In step 1702, a plurality of reference points associated with spatial input provided by a user within a physical user space associated with a display screen is identified. Step 1702 may be performed in any of the ways described above.

In step 1704, a vector is determined based on the reference points. Step 1702 may be performed in any of the ways described above.

In step 1706, an intersection of the vector with the display screen is determined. Step 1706 may be performed in any of the ways described above.

In step 1708, the intersection is set as a cursor position on the display screen. Step 1708 may be performed in any of the ways described above.

One or more steps shown in FIGS. 15-17 may be repeated to map spatial input to one or more additional cursor positions on the display screen. As described above, multiple cursors may be projected onto a display screen based on spatial input provided by a single or multiple users.

Additionally or alternatively, one or more steps shown in FIGS. 15-17 may be performed based on a vector projection heuristic and/or a plane projection heuristic, which may have been calibrated based on user input provided during execution of a calibration mode, as described above. Additionally or alternatively, one or more steps shown in FIGS. 15-17 may be performed during execution of and/or as part of a calibration mode.

In certain implementations, any of the steps shown in method 1500, 1600, or 1700 of FIGS. 15-17 may be part of an event loop in which any of the steps may be performed at any time within the event loop. To this end, each step may be associated with a callback handler configured to facilitate performance of the corresponding step within the event loop.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a spatial input subsystem configured to
visually detect a hand gesture acted out by a user within a physical user space associated with a display screen, the hand gesture having an index finger pointing at the display screen,
determine that the detected hand gesture is predefined to indicate a request for cursor projection, and
output data associated with the hand gesture in response to the determination;
a cursor projection subsystem communicatively coupled to the spatial input subsystem and configured to
receive the data associated with the hand gesture from the spatial input subsystem, and
map the hand gesture to at least one cursor position on the display screen based on at least one of a plane projection heuristic and a vector projection heuristic.

2. A method comprising:
detecting, by a cursor projection system, spatial input provided by a user within a physical user space associated with a display screen;
determining, by the cursor projection system, that the detected spatial input is predefined to indicate a request for cursor projection; and
mapping, by the cursor projection system, the spatial input to a cursor position on the display screen based on a vector projection heuristic by identifying a plurality of reference points associated with the spatial input, determining a vector based the plurality of reference points, determining an intersection of the vector intersects with the display screen, and setting the intersection as the cursor position on the display screen.

3. The method of claim 2, wherein:

the spatial input comprises a hand gesture acted out by the user within the physical user space, the hand gesture having an index finger pointing at the display screen; and the plurality of reference points comprises a first reference point associated with a tip of the index finger and a second reference point associated with another part of the index finger.

4. The method of claim 2, wherein:

the spatial input comprises a hand gesture acted out by the user within the physical user space, the hand gesture having an index finger pointing at the display screen; and the plurality of reference points comprises a first reference point associated with the index finger and a second reference point associated with an eye of the user.

5. The method of claim 2, further comprising:

executing, by the cursor projection system, a calibration mode configured to facilitate a calibration of the vector projection heuristic;

receiving, by the cursor projection system, user input during the calibration mode; and calibrating, by the cursor projection system, the vector projection heuristic by defining, based on the user input, the reference points to be identified and used in the determining of the vector.

6. The method of claim 2, further comprising:

mapping, by the cursor projection system, the spatial input to an additional cursor position on the display screen based on the vector projection heuristic by identifying a plurality of other reference points associated with the spatial input, determining an additional vector based the plurality of other reference points, determining an additional intersection of the additional vector with the display screen, and setting the additional intersection as the additional cursor position on the display screen.

7. The method of claim 2, embodied as computer-executable instructions on at least one tangible computer-readable medium.

8. A method comprising:

detecting, by a cursor projection system, spatial input provided by a user within a physical user space associated with a display screen;

determining, by the cursor projection system, that the detected spatial input is predefined to indicate a request for cursor projection; and mapping, by the cursor projection system, the spatial input to a cursor position on the display screen based on a plane projection heuristic by projecting a sub-region virtual plane within the physical user space, determining a position on the sub-region virtual plane based on the spatial input, and mapping the position on the sub-region virtual plane to the cursor position on the display screen.

9. The method of claim 8, further comprising:

detecting, by the cursor projection system, additional spatial input provided by another user within the physical user space associated with the display screen;

determining, by the cursor projection system, that the additional spatial input is associated with another request for cursor projection; and mapping, by the cursor projection system, the additional spatial input to an additional cursor position on the display screen based on the plane projection heuristic by projecting an additional sub-region virtual plane within the physical user space;

determining a position on the additional sub-region virtual plane based on the additional spatial input; and mapping the position on the additional sub-region virtual plane to the additional cursor position on the display screen.

10. The method of claim 9, wherein the sub-region virtual plane and the additional sub-region virtual plane are projected at distinct planar areas located within the physical user space and oriented parallel to the display screen.

11. The method of claim 9, further comprising:

executing, by the cursor projection system, a calibration mode configured to facilitate a calibration of the plane projection heuristic;

receiving, by the cursor projection system, user input during the calibration mode;

defining, by the cursor projection system, the sub-region virtual plane and the additional sub-region virtual plane based on the user input; and calibrating, the plane projection heuristic for mapping each of the sub-region virtual plane and the additional sub-region virtual plane to the display screen.

12. The method of claim 11, wherein the user input comprises:

a spatial indication by the user of boundary locations of the sub-region virtual plane within the physical user space; and a spatial indication by the another user of boundary locations of the additional sub-region virtual plane within the physical user space.

13. The method of claim 8, embodied as computer-executable instructions on at least one tangible computer-readable medium.

14. A method comprising:

detecting, by a cursor projection system, spatial input provided by a user within a physical user space associated with a display screen;

determining, by the cursor projection system, that the detected spatial input is predefined to indicate a request for cursor projection; and mapping, by the cursor projection system, the spatial input to at least one cursor position on the display screen based on at least one of a plane projection heuristic and a vector projection heuristic.

15. The method of claim 14, wherein the mapping is based on the plane projection heuristic and comprises:

projecting a virtual plane within the physical user space;

determining at least one position on the virtual plane based on the spatial input; and mapping the at least one position on the virtual plane to the at least one cursor position on the display screen.

16. The method of claim 14, wherein the mapping is based on the vector projection heuristic and comprises:

identifying a plurality of reference points associated with the spatial input;

determining at least one vector based on the reference points;

determining at least one intersection of the at least one vector with the display screen; and setting the at least one intersection as the at least one cursor position on the display screen.

17. The method of claim 14, wherein the mapping is based on the plane projection heuristic and the vector projection heuristic and comprises:

mapping the spatial input to a first cursor position on the display screen based on one of the plane projection heuristic and the vector projection heuristic; and mapping the spatial input to an additional cursor position on the display screen based on the other of the plane projection heuristic and the vector projection heuristic.

18. The method of claim 17, wherein:

the spatial input is mapped to the first cursor position based on the plane projection heuristic, the first cursor position representing a translational position of the spatial input on a virtual plane projected in the physical user space, the virtual plane oriented parallel to the display screen; and the spatial input is mapped to the additional cursor position based on the vector projection heuristic, the additional cursor position representing at least one of a pitch rotation and a yaw rotation of the spatial input.

19. The method of claim 18, wherein the spatial input comprises a hand gesture acted out by the user within the physical user space, the hand gesture having an index finger pointing at the display screen.

20. The method of claim 14, wherein the at least one cursor position comprises a plurality of cursor positions, and wherein the method further comprises:

detecting, by the cursor projection system, an existence of a predefined relationship between the plurality of cursor positions; and automatically executing, by the cursor projection system, an operation in response to the detected existence of the predefined relationship.

21. The method of claim 14, further comprising providing, by the cursor projection system, a tool configured to facilitate the user providing input to select between use of the plane projection heuristic and the vector projection heuristic in the mapping of the spatial input to the at least one cursor position on the display screen.

22. The method of claim 14, further comprising:

executing, by the cursor projection system, a calibration mode configured to facilitate user calibration of the at least one of the plane projection heuristic and the vector projection heuristic;

receiving, by the cursor projection system, user input during the calibration mode; and calibrating, by the cursor projection system, the at least one of the plane projection heuristic and the vector projection heuristic based on the user input.

23. The method of claim 22, wherein the calibrating comprises:

defining, based on the user input, a sub-region virtual plane for projection within the physical user space; and calibrating the plane projection heuristic for mapping the sub-region virtual plane to the display screen.

24. The method of claim 14, embodied as computer-executable instructions on at least one tangible computer-readable medium.

* * * * *